US009628949B2

(12) United States Patent
Moldavsky et al.

(10) Patent No.: US 9,628,949 B2
(45) Date of Patent: *Apr. 18, 2017

(54) DISTRIBUTED DATA IN A CLOSE PROXIMITY NOTIFICATION SYSTEM

(71) Applicant: ConnectQuest LLC, West Simsbury, CT (US)

(72) Inventors: David Moldavsky, West Simsbury, CT (US); Joseph A. Tocco, Canton, CT (US)

(73) Assignee: CONNECTQUEST LLC, West Simsbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,100

(22) Filed: Dec. 21, 2015

(65) Prior Publication Data

US 2016/0119746 A1 Apr. 28, 2016

Related U.S. Application Data

(63) Continuation of application No. 14/546,118, filed on Nov. 18, 2014, now Pat. No. 9,219,981, which is a
(Continued)

(51) Int. Cl.
*H04W 4/02* (2009.01)
*G06Q 30/02* (2012.01)
(Continued)

(52) U.S. Cl.
CPC .......... *H04W 4/02* (2013.01); *G06Q 30/0261* (2013.01); *G06Q 30/0267* (2013.01);
(Continued)

(58) Field of Classification Search
CPC ........ H04W 4/02; H04W 4/008; H04W 4/20; H04W 8/005; G06Q 30/0267; G06Q 30/0261
(Continued)

(56) References Cited

U.S. PATENT DOCUMENTS 5,778,304 A 7/1998 Grube
8,423,003 B2 4/2013 Sarukkai et al.
(Continued)

FOREIGN PATENT DOCUMENTS

WO 2014151059 A1 9/2014

OTHER PUBLICATIONS

International Preliminary Report on Patentability for International Application Serial No. PCT/US2012/050883. International filing date Aug. 15, 2012, Date of Mailing: Feb. 27, 2014.
(Continued)

*Primary Examiner* — Sharad Rampuria
(74) *Attorney, Agent, or Firm* — Cantor Colburn LLP

(57) ABSTRACT

An aspect includes providing distributed data in a close proximity notification system using a transceiver that includes an antenna and a processing device. The processing device includes a memory for storing instructions that when executed by the processing device result in the transceiver: discovering wireless mobile devices within a proximity range of the transceiver; initiating communication between the transceiver and one or more of the wireless mobile devices; exchanging data with the one or more of the wireless mobile devices, the exchanging including receiving a request for information from one of the one or more of the wireless mobile devices; based on receiving the request for information, identifying a retrieval location of at least a subset of the requested information; and transmitting the at least subset of the information or an identifier of the retrieval location to the wireless mobile device.

20 Claims, 18 Drawing Sheets

Related U.S. Application Data continuation-in-part of application No. 14/450,547, filed on Aug. 4, 2014, now Pat. No. 9,219,979, which is a continuation of application No. 13/586,191, filed on Aug. 15, 2012, now Pat. No. 8,831,642.

(60) Provisional application No. 61/523,633, filed on Aug. 15, 2011.

(51) Int. Cl.
   *H04W 8/00* (2009.01)
   *H04W 4/00* (2009.01)
   *H04W 4/20* (2009.01)

(52) U.S. Cl.
   CPC ............. *H04W 4/008* (2013.01); *H04W 4/20* (2013.01); *H04W 8/005* (2013.01)

(58) Field of Classification Search
   USPC ............... 455/456.1–457, 414.1–414.4, 41.2
   See application file for complete search history.

(56) References Cited

U.S. PATENT DOCUMENTS

| | | | |
|---|---|---|---|
| 8,433,296 B2 | 4/2013 | Hardin et al. | |
| 8,433,342 B1 | 4/2013 | Boyle et al. | |
| 8,437,384 B2 | 5/2013 | MaGuire | |
| 8,515,459 B2 | 8/2013 | Busch | |
| 8,588,816 B2 | 11/2013 | Collins | |
| 8,660,951 B2 | 2/2014 | Calman | |
| 8,666,376 B2 | 3/2014 | Ramer et al. | |
| 8,688,147 B2 | 4/2014 | Nguyen et al. | |
| 8,718,598 B2 | 5/2014 | Johnson | |
| 8,891,594 B2 | 11/2014 | McGuire | |
| 8,897,344 B2 | 11/2014 | MaGuire | |
| 8,897,707 B2 | 11/2014 | Faith | |
| 2003/0224795 A1* | 12/2003 | Wilhoite | H04W 40/38 455/445 |
| 2007/0124077 A1* | 5/2007 | Hedlund | G06Q 10/087 701/300 |
| 2008/0120186 A1 | 5/2008 | Jokinen et al. | |
| 2008/0261526 A1 | 10/2008 | Suresh et al. | |
| 2009/0214039 A1 | 8/2009 | Chen et al. | |
| 2009/0248435 A1 | 10/2009 | Macwan et al. | |
| 2009/0313109 A1 | 12/2009 | Bous et al. | |
| 2010/0174599 A1 | 7/2010 | Rosenblatt et al. | |
| 2010/0280904 A1 | 11/2010 | Ahuja et al. | |
| 2010/0287011 A1 | 11/2010 | Muchkaev et al. | |
| 2010/0287052 A1 | 11/2010 | Minter et al. | |
| 2011/0092185 A1 | 4/2011 | Garskof | |
| 2011/0178863 A1 | 7/2011 | Daigle | |
| 2011/0246659 A1* | 10/2011 | Bouazizi | H04N 21/2343 709/231 |
| 2011/0302014 A1 | 12/2011 | Proctor, Jr. et al. | |
| 2012/0047011 A1 | 2/2012 | Rippetoe et al. | |
| 2012/0289255 A1 | 11/2012 | Robards et al. | |
| 2013/0214909 A1* | 8/2013 | Meijers | H04W 4/008 340/10.5 |
| 2013/0217332 A1* | 8/2013 | Altman | H04H 60/90 455/41.2 |
| 2013/0217333 A1 | 8/2013 | Sprigg | |
| 2013/0218681 A1 | 8/2013 | Haney et al. | |
| 2013/0282438 A1* | 10/2013 | Hunter | G01S 1/02 705/7.32 |
| 2013/0285855 A1 | 10/2013 | Dupray | |
| 2013/0337841 A1 | 12/2013 | Johnson et al. | |
| 2014/0258405 A1 | 9/2014 | Perkin | |
| 2014/0280316 A1 | 9/2014 | Ganick | |
| 2015/0003333 A1 | 1/2015 | McGuire | |
| 2015/0012840 A1 | 1/2015 | Maldari | |
| 2015/0082452 A1 | 3/2015 | Taylor | |
| 2015/0095402 A1 | 4/2015 | Fraccaroli | |
| 2016/0014568 A1 | 1/2016 | Naqvi | |

OTHER PUBLICATIONS

International Search Report and Written Opinion; Date Mailed Oct. 17, 2012; 9 pages.

Shek, "Next-Generation Location Based Services for Mobile Devices," Computer Sciences Corporation, Feb. 2010, 66 pages.

* cited by examiner

FIGURE 13
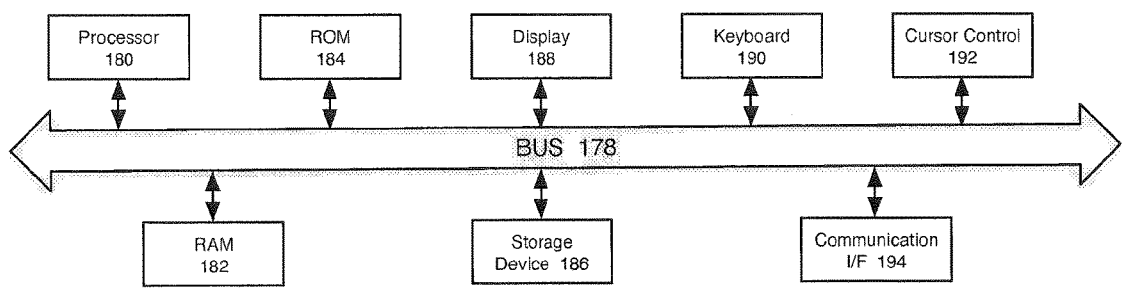
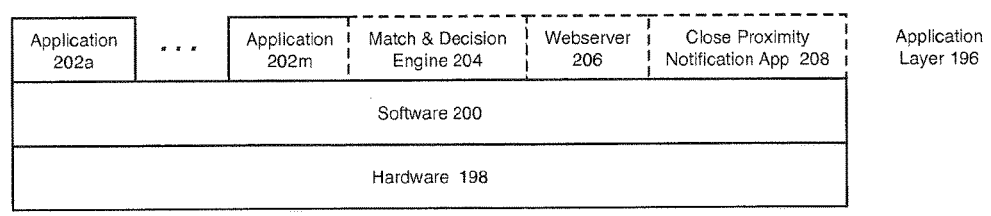
FIGURE 14

US 9,628,949 B2

DISTRIBUTED DATA IN A CLOSE PROXIMITY NOTIFICATION SYSTEM

CROSS-REFERENCE TO RELATED APPLICATIONS

The present application is a continuation of U.S. patent application Ser. No. 14/546,118 filed Nov. 18, 2014 which is continuation-in-part of U.S. patent application Ser. No. 14/450,547 filed Aug. 4, 2014, which is a continuation of U.S. patent application Ser. No. 13/586,191 filed Aug. 15, 2012, now U.S. Pat. No. 8,831,642, which claims the benefit of U.S. Provisional Patent Application 61/523,633 filed Aug. 15, 2011, the contents of all of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright ConnectQuest, LLC, All Rights Reserved.

FIELD OF THE INVENTION

The present invention relates to methods and systems for location-dependent provision of data and information to a wireless communication device.

BACKGROUND

In targeted marketing, it is often desirable to provide information to select individuals located in a certain geographic area. For example, a service provider may prefer to advertise to potential customers who are in close proximity to the provider's office. Likewise, retailers often prefer to advertise in local media so as to reach likely customers for their establishments.

Groupon™, Living Social™, Yippit™ and other Internet-based marketing services have attempted to capitalize on retailer's desires for local advertising. However, the mechanisms employed by such companies are somewhat disconnected from the actual shopping experience. For example, these companies typically require users to access their respective Web sites or to be notified by email of specific deals offered by retailers. Often, such communications are quite asynchronous in the context of a consumer's shopping behavior. Consider, for example, that for a consumer to take advantage of a deal offered by one of these companies, the consumer must first purchase the deal online, download a coupon or voucher, and then travel to the retailer's location with the coupon or voucher in-hand (usually within a prescribed time period) in order to claim the associated merchandise. Unless the consumer is especially interested in the proposed transaction and has the time available to conduct the transaction before the coupon expires, he/she is not likely to partake in such activities. Further, in order to participate in such schemes, retailers must agree to a substantial discount for its products and services and also pay commissions to the advertising services. As a result, it is questionable whether retailer experiences much in the way of a significant benefit from such advertising schemes.

SUMMARY OF THE INVENTION

Embodiments include methods, computer program products, and transceivers for distributed data in a close proximity notification system. An embodiment of a transceiver includes an antenna and a processing device. The processing devices includes a memory for storing instructions that when executed by the processing device result in: discovering wireless mobile devices within a proximity range of the transceiver; initiating communication between the transceiver and one or more of the wireless mobile devices; exchanging data with the one or more of the wireless mobile devices, the exchanging comprising receiving a request for information from one of the one or more of the wireless mobile devices; based on receiving the request for information, identifying a retrieval location of at least a subset of the requested information; and transmitting the at least a subset of the information or an identifier of the retrieval location to the wireless mobile device.

BRIEF DESCRIPTION OF THE DRAWINGS

The present invention is illustrated by way of example, and not limitation, in the figures of the accompanying drawings, in which:

FIG. 3 shows an example of a home screen which enables a user to access primary functions of a close proximity notification application; FIG. 4 is an example of the display of a push notification which advises a user of a promotional offer from a participating retail store; FIG. 5 shows various examples of participating retail store promotions; FIG. 6 shows an example of a review page which enables the user to view promotions they have previously received; and FIG. 7 is an example of a search page which allows a user to input search criteria.

FIGS. 13 and 14 illustrate examples of computer architectures suitable for use in connection with the present invention.

DETAILED DESCRIPTION

Figure 1:
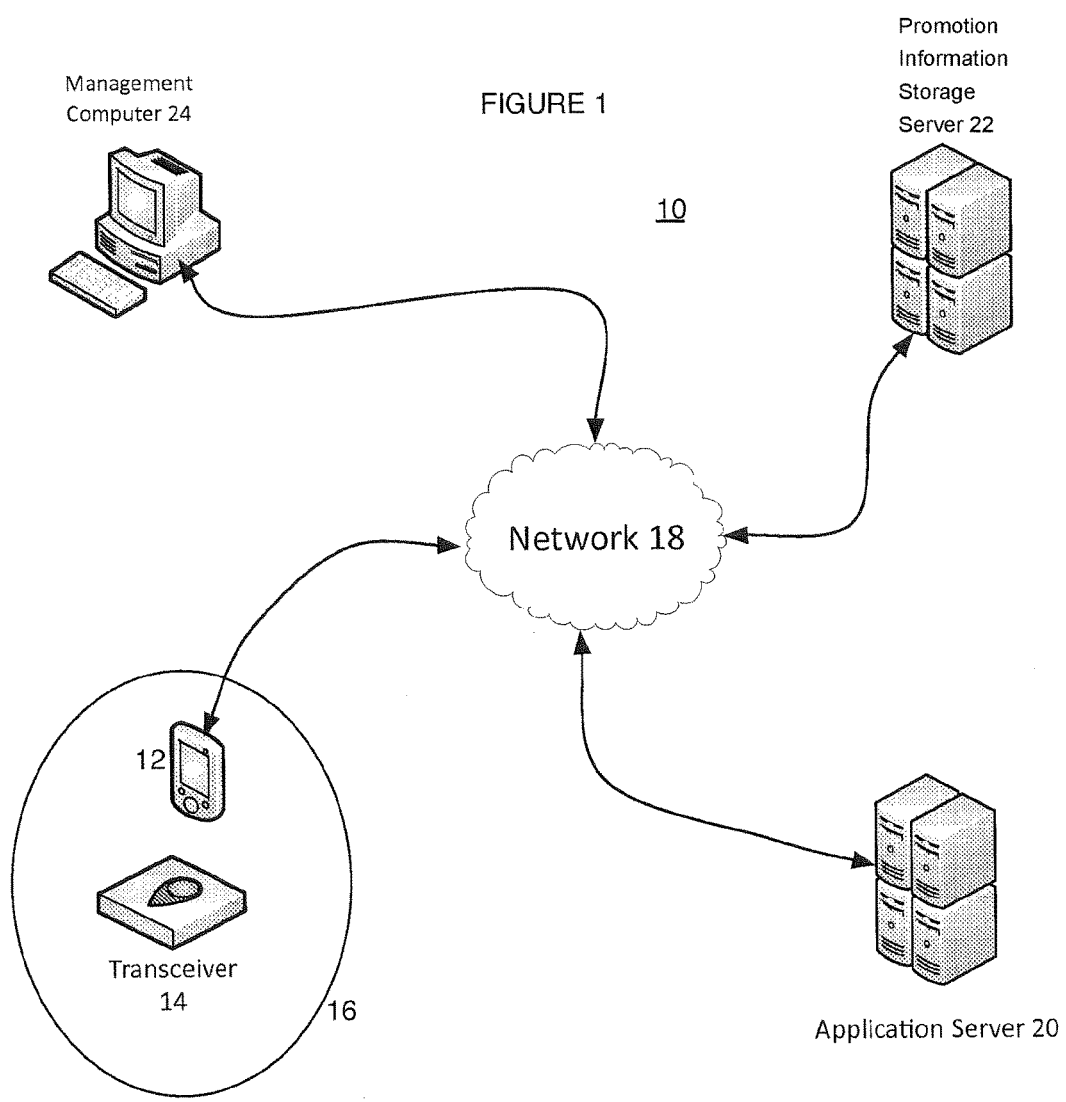
FIG. 1 is a block diagram illustrating components of a close proximity notification system configured in accordance with an embodiment of the invention.

Recognizing the deficiencies of prior methodologies, the present inventors have developed methods and systems for location-dependent provision of information to mobile devices, and, more particularly, to users thereof. While such methods and systems may be employed to deliver a wide array of information, they find particular application in the delivery of advertising or marketing materials (e.g., discount coupons and the like) when mobile device users are in immediate proximity to the establishments associated with those materials (e.g., retail or service establishments at which the coupons may be redeemed). Thus, the methods and systems of the present invention avoid the asynchronous nature of many Internet-based marketing schemes in that the delivery of the information coincides with the consumer's presence at or near the very establishment for which the information is relevant. Retailers benefit because the targeting of consumers who are in the immediate vicinity of their establishments may spur sales which otherwise might not have occurred—the very goal of local advertising.

The present invention provides a method for providing information to a user ui, comprising the steps of: (a) transmitting signal Si from a location li, wherein li is positioned within a space and the signal Si comprises a location identification code ci; (b) receiving the signal Si on a mobile device mi for a user ui located within the space; (c) retrieving the information li from at least one server using the signal Si wherein the information li retrieved by mobile device mi is gated through a filter fi such that li is a function of fi and Si; and (d) displaying information li on the mobile device mi.

The present invention also provides a system for providing information to a user ui. The system comprises: (a) a transceiver (or a transmitter) operable to transmit signal Si from a location li, wherein li is positioned within a space and the signal Si comprises a location identification code ci; (b) a mobile device mi for a user ui located within the space, wherein the mobile device mi is operable to receive the signal Si; and (c) at least one server, wherein the mobile device mi is operable to retrieve information ii from the server using Si, and wherein the information li is gated through a filter fi such that li is a function of fi and Si, and displayed on the mobile device mi.

The location identification code, $c_i$, may comprise positional information $P_i$ for $l_i$. At least one location $l_i$ may have a store, $st_i$, for sale of commercial goods. At least one location $l_i$ may have a restaurant, $r_i$. The location $l_i$ may be static or mobile. The space may be defined by effective range of the signal $s_i$ transmitted from the locations $l_i$. The space may have a radius of less than about 50 meters, or less than about 30 meters.

The filter, fi, may be user-defined. The filter, $f_i$, may be automatically modified based on the user's past actions, for example, by a mobile device application or by the server. The filter, $f_i$, comprises criteria, $cr_i$, for the user $u_i$. The criteria, $cr_i$, may comprise shopping preferences, $sp_i$, for the user $u_i$. The criteria, cri, may comprise position preferences, $pp_i$, for the user $u_i$.

The effective range of the signal Si transmitted from the locations $l_i$ may or may not be adjusted. The signal $s_i$ may be transmitted from the locations $l_i$ over a Bluetooth, RFID, Wibree, UWB (ultra-wideband), WUSB (wireless USB) and/or WLAN (wireless local area network) connection. For example, the signal transmitted from the locations li may be limited to the effective range (e.g., by design) of Bluetooth transmission.

The mobile device mi can be in wireless Internet communication with the server. The mobile device $m_i$ can be a mobile phone or smart phone. The information $i_i$ is displayed on the mobile device $m_i$ with or without a user-implemented prompt. The mobile device $m_i$ comprises a software application for managing the information $i_i$. The information $i_i$ may comprise a service provided to the user $u_i$. The mobile device $m_i$ may further comprise a software application for the user $u_i$ to search for a desired service. The desired service may be searched by shopping preferences of the user $u_i$, and/or by position preferences of the user $u_i$. The information ii may comprise a coupon, and/or availability of commercial goods. The information $l_i$ may be time-sensitive. The information $i_i$ may be displayed on the mobile device $m_i$ with an audible alarm.

The mobile device mi may further comprise a means for the user $u_i$ to take an action based on the information $i_i$, such as prepaying for the service.

These and further embodiments of the invention are described in greater detail below.

Described herein are methods and systems for location-dependent provision of information to a mobile device (e.g., a mobile phone, smart phone, tablet computer system or similar device). The information may be any information related to and broadcast by an entity, such as a service provider (e.g., a retail store). In one embodiment, as a user of a mobile device comes into proximity of a retail store, promotion information of the retail store is displayed on the user's mobile device. The display may involve the transmission of the promotion information to the mobile device, or may involve the transmission of instructions to display promotion information previously stored on or accessible to the mobile device. In another embodiment, when a user is within proximity of a restaurant, the user may view the menu of the restaurant on his/her mobile device and, optionally, make a dinner reservation.

A close proximity notification system configured in accordance with embodiments of the present invention may thus be used to notify potential customers, in real time, of information that a retailer or service provider wishes to provide. This may include deals (e.g., discount opportunities) in the potential customer's immediate area. For example, notifications of deals at a retail store may be provided to a potential customer (via that individual's mobile device) as he/she travels past the very retail store offering the deal, or even while the individual is shopping within the establishment. To illustrate this latter example, consider an individual shopping in one department of a large department store or in one store in a shopping mall. Using the methods and systems of the present invention, that shopper may receive notification of deals being offered within other departments of the department store or other stores within the shopping mall. Because the present methods and systems target consumers within the immediate vicinity of an establishment (indeed, even within an establishment in which the consumer may already be located), and unlike other discount-based marketing services, there are no requirements for a retailer to set aside a large volume of discounted products, offer greatly discounted services, pay commissions, or collect coupons.

The promotion material and/or other information may be delivered to a user's mobile device in any of a variety of ways. In one example, promotion material may be delivered via a text or similar message (e.g., using a Short Message Service (SMS) or Multimedia Message Service (MMS) commonly employed in conjunction with mobile phone telecommunications carrier networks) to a potential customer's mobile device, offering time-sensitive incentives or rewards for products and/or services designed to motivate the potential customer to enter the store and shop. Alternatively, or in addition, promotion material may be delivered by way of voice mail or electronic mail (email) message to a potential customer's mobile device. In still other examples, the promotion material may be delivered to an application running on the potential customer's mobile device. This may involve transmitting the promotion material directly to the application, transmitting instructions for the application to display a previously stored version of the promotion material, or transmitting instructions for the application to obtain the promotion material from a designated or known location, such as a remote server or other storage location.

Promotion materials or messages so delivered can be tailored or rotated to take advantage of times of day, volumes of sales, excessive inventories, holiday specials, etc. In some instances, customer profiles may be maintained in order to allow the delivery of promotion materials desired by the customer or targeted to appeal to the customer's tastes or previous purchase habits. In some cases, customer profiles may be developed from or incorporate respective personal profiles of prospective customers as maintained by those prospective customers at one or more social media sites.

Merchants and/or service providers who participate in programs that make use of the methods and systems of the present invention may do so on a variety of terms and conditions. In one example, participating merchants or service providers may pay a monthly service fee to a provider of a close proximity notification service. In other examples, commission-based remuneration schemes may be employed. Still other examples may involve one-time purchases of entire close proximity systems, to be independently operated by an individual retailer or service provider. Combinations of some or all of the above practices may also be employed.

With the above in mind, further details regarding methods and systems that exemplify the present invention will be discussed. These methods and systems are not intended to be the sole means by which the present invention may be implemented; rather, they are intended to provide the reader with a written description of the invention, and of the manner and process of making and using it, in such full, clear, concise, and exact terms as to enable any person skilled in the art to which it pertains, or with which it is most nearly connected, to make and use the same, and to articulate the best mode presently contemplated by the inventors for carrying out the invention.

FIG. 1 diagrammatically illustrates, in simplified form, an environment 10 for location-dependent provision of information to a mobile device in accordance with an embodiment of the present invention. The mobile device 12 illustrated in FIG. 1 is capable of establishing Internet connections (e.g., over a mobile phone telecommunication carrier's network and/or a wireless local area network (WLAN), or other means), is equipped with short-range (e.g., in some cases 10-30 meters, or, in other instances 10-150 meters, etc.) communications hardware, software and/or firmware compatible or compliant with a short-range wireless communication protocol (e.g., Bluetooth™), and is programmed with a software application or firmware configured for use with the close proximity notification schemes described herein. In some instances, the mobile device may employ custom hardware to facilitate use of the close proximity notification schemes, however, in most instances such schemes will be facilitated through software applications capable of being executed by one or more processors of the mobile device. As is familiar to owners of mobile devices such as smart phones and tablet computer systems, applications intended for use on or with mobile devices are commonly available for download to mobile devices from one or more "app" stores (e.g., web sites from which software purchases can be made) operated by service providers such as Apple, Inc., Google, Inc., and others, and applications compatible with the close proximity notification schemes described herein may be provided or made available for download through such means. In other instances, the applications may be provided pre-installed at the time the mobile device is purchased (e.g., as a stand alone application or an embedded resource within a mobile device's operating system).

Also shown in FIG. 1 is a short-range wireless transceiver 14. The wireless transceiver 14 is deployed by the retail merchant or service provider wishing to make use of the present close proximity notification service (for example, in or near a store area close to where prospective customers are likely to pass by, in or near a particular department of a department store, or other location, typically nearby an establishment or area to which the merchant or service providers wishes to attract potential customers). When activated, the transceiver 12 broadcasts a Bluetooth (or other, short-range) wireless signal that includes the transceiver's media access control (MAC) address or other unique identifier. The identifier may be associated with the transceiver, the merchant that deployed the transceiver or other entity for which the targeted information that will be delivered or made available to the mobile device is relevant. When the mobile device 10 passes within a relatively short distance (illustrated by boundary line 16), e.g., an area of approximately 10-150 meters radius, of the transceiver, the mobile device receives the broadcast and the close proximity notification application running on the mobile device stores the MAC address (or other identifier). As will be apparent from the discussion below, some implementations require only a transmitter rather than a transceiver 14; however, we will use the term transceiver in the discussion that follows so as to highlight the more general case. As so used, the term transceiver should be understood as referring to only a transmitter when the implementation permits it.

The mobile device 12 is further in wireless communication, e.g., via the Internet or other communications network or network of networks 18, with an application server 20. That is to say, having received the broadcast from transceiver 14, the application running on the mobile device seeks to establish communication with the data server 20. Upon successfully contacting the server, the MAC address (or other identifying information) of the transceiver 14 stored by the close proximity notification application running on mobile device 12 is transmitted (e.g., under the control of the close proximity notification application, or, in some cases, with user consent) from the mobile device to application server 20. In some cases, information concerning the mobile device (e.g., a MAC address or other identifying information associated with the mobile device, e.g., a serial number or other identifier of the close proximity notification application) may also be transmitted to the application server 20. This latter transmission may require user consent either immediately prior to the transmission or at some earlier time (e.g., though user consent to terms and conditions of a license agreement under which the application for mobile device 12 is provided).

The application server 20 stores, in a database, information regarding the merchant or service provider that has deployed transceiver 14. For or example, application server 20 may store promotion material (e.g., business and/or advertising information, or, as discussed below, information concerning where such material may be obtained) for the establishment that has deployed transceiver 14. This information is associated with the MAC address (or other identifier) of the transceiver 14, hence, upon receipt of that MAC address from the mobile device 12, the application server 20 can determine what promotion material will be relevant to the mobile device (or, more particularly, the user thereof).

This point bears further attention-unlike Internet-based marketing schemes that may be broadly applicable to and unable to discriminate between potential customers dispersed over large geographic areas, the use of a short-range wireless transceiver 14 ensures that any mobile device that transmits information to the application server 20 must be located within close proximity to the location at which the transceiver is deployed. The potential customer (i.e., the user of mobile device 12) is literally at the doorstep of the retailer or service provider. When the application server 20 receives the identifying information of transceiver 14, information that is highly relevant to the user of the mobile device (because of that user's proximity to the retail or service establishment associated with transceiver 14) can be determined.

Application server 20 may, but need not, also store information associated with mobile device 12, or, more particularly, a user associated with the mobile device. For example, application server 20 may store information regarding previously defined preferences (filters) of the user (e.g., shopping preferences), and the user's criteria for one or more searches. In some instances, application server 20 may store more detailed user profiles (e.g., compiled or obtained from a user's social media profiles, past shopping behaviors, etc.) in lieu of or in addition to the user preferences. Such profiles can be consulted before any information is provided from the data server 20 to the mobile device 12 in order to ensure that user's preferences for receiving such information are respected or complied with. The profiles may also be useful in determining which of several possible variants of materials should be provided. For example, if a store is running several promotions at one time, but only some would be relevant to a particular customer (e.g., because of the individual's age, marital status, interests, etc.), then the use of customer profiles may assist in ensuring that the data server delivers or instructs the close proximity notification application to obtain only those promotions relevant for the particular customer.

Thus, data server 20 uses the MAC address (or other unique identifier information) regarding transceiver 14, filter selections, and/or user profile information to determine what information to provide to the mobile device 12. We refer to this as location-dependent provision of information because the provision of information is dependent upon the mobile device having received the signal broadcast by transceiver 14. Because that signal is only broadcast over a short range (e.g., 10-150 meters), one can be assured that any mobile device having the information (and subsequently sending it to the data server 20) must be in close proximity to the transceiver 14.

Responsive to receipt of the transceiver MAC address (or other identifying information) from the mobile device 12, application server 20 might, in some cases, provide the actual promotion information specified by the retailer or service provider that deployed transceiver 14 directly back to the mobile device 12 (e.g., over a telecommunications network in the form of an SMS or MMS message or as a Web page, image, short audio video presentation, or similar object). Alternatively, or in addition, data server 20 may provide the mobile device 12 with information sufficient for the close proximity notification application running on the mobile device to retrieve the promotion information. For example, the server 20 may provide the mobile device 12 an address (e.g., a Web address such as a uniform resource locator (URL)) of a promotion material storage server 22 from which the promotion material may be downloaded, and the close proximity notification application running on the mobile device may be configured to retrieve the promotion material from that address (e.g., using its own or another Web browser or other application installed on the mobile device 12) and display it on mobile device 12. In such instances, the address provided by data server 20 may include sufficient information to uniquely identify a particular item of promotion material from all of the promotion materials stored by server 22, so that the retrieval process need not require user selection from among a variety of choices.

In still other instances, the data server may instruct the close proximity notification application running on the mobile device which of a number of previously stored promotion materials resident on the mobile device (or an associated storage unit, such as a subscriber identity module (SIM) card or the like) to display on the mobile device. In this latter instance, the close proximity notification application may be configured to periodically (or at user direction) download and store various promotion materials for various merchants (e.g., determined by user preference settings, mobile device location information collected over time, merchant advertising campaigns, and/or other factors). Then, upon direction of the data server 20, the close proximity notification application running on the mobile device 12 may display one or more of those previously stored materials, as appropriate to the location of the mobile device determined by its proximity to the transceiver 14.

Finally, FIG. 1 shows a computer system 24, from which the operator of the retail store or service establishment at which transceiver 14 is deployed may manage his/her account with the close proximity notification service. Such management may include designing and/or selecting promotion information desired to be delivered to users of the mobile devices, schedules for ad rotations, etc. Such management may be achieved via a management console having access to the application server 20 and promotion material storage server 22. For example, the retailer may log in to an account maintained at the application server 20 through an appropriate Web site interface and through that account specify materials for use. The materials themselves may be stored at promotion materials storage server 22, but nevertheless accessible through a single management interface.

Application server 20 and promotion materials server 22 are shown as single, independent servers merely for purposes of this explanation and in practice may be components of a cloud computing infrastructure made up of dozens or even hundreds of servers at one or more data centers through which multiple different kinds of services may be delivered.

In one particular embodiment, which is not intended as a limitation of the invention but rather an example thereof, various transceivers 14 are deployed at a number of retail stores. The promotion information each retail store selects to broadcast is uploaded to a server provided through Amazon, Inc.'s S3 cloud storage services, which serves as a promotion material storage server. The application server is, in this instance, a Google AppEngine application server and the management console is accessed through this facility. Data regarding the retail stores (e.g., the various transceivers deployed thereat) is stored on the AppEngine server in extensible markup language (XML) format, with data of different stores stored as separate XML files. The files are mapped under unique URLs (e.g., an HTTP URL, an HTTPS URL). Each retail store's transceiver transmits a unique MAC address over a Bluetooth or other short-range wireless channel, which MAC addresses can be received by individual mobile devices in close proximity (e.g., within about 10 to about 150 meters) to the respective transceivers. The close proximity notification application running on a respective one of the mobile devices provides this MAC address over the air to the application server, which, in turn, returns a URL from which promotion material associated with the MAC address (i.e., the store that deployed the transceiver with the respective MAC address) can be obtained. The URL may be associated with general promotion material associated with the retail store, or may be somewhat personalized for the user (as identified through information concerning the mobile device that is transmitted with the transceiver MAC address). For example, personalized URLs may point to promotion material intended to appeal to users having shopping habits, interests, or other characteristics determined though personal profiles maintained by the close proximity notification service or obtained through analysis of the user's self-declared social media profiles. The close proximity notification application then uses the URL to contact the promotion material storage server and download the promotion material of the retail store from the data store. Once downloaded to the mobile device, the promotion material may be displayed to the user of the mobile device (e.g., accompanied by an audible or other alert to notify the user that it is available). Note that in other instantiations, the functionality and storage provided by the Amazon S3 server and Google AppEngine server (and their respective data stores) may be consolidated in a single server or server farm and a single respective data store or data storage cloud.

Other instantiations of the present invention may involve locations/applications other than retail stores. For example, the present invention may find application in any of the following environments, among others:

A) Large venues: This may include, among other things, stadiums, concert halls, conference centers, department stores, etc. In such environments, transceivers similar to those described above may be placed throughout the venue and information pertaining to deals/offers transmitted to event-goers' or shoppers' mobile devices as they pass in close proximity to the respective transceivers. The transceivers can be deployed and configured to run synchronously to cover a large area or they can be configured to run discreetly providing unique messages tailored to different spaces within the venue (such as ticket booths, concession stands, or sales departments, etc.). The venue can customize and schedule deals/offers tailored to their event or sales schedule. This could be sales in particular departments, or deals/offers tailored to event-goers as they are entering, during and exiting an event.

B) Real Estate: In cases of both residential and commercial real estate, transceivers may be placed in and around a subject property (e.g., house, condominium, building, office, etc.). Information about the subject offering is transmitted to interested parties' smartphones as they pass in close proximity to the property. The interested party can review information pertaining to the property, store the information for later review, search for additional properties, forward the information to another person, and/or in real time, dialog with the listing agent.

C) Security: Transceivers may be deployed at various locations to ensure security guards perform their predefined rounds. The transceivers transmit to smartphones as the security guards pass in close proximity. Time, location (and other relevant data) may then be automatically transmitted to a server and recorded (creating an automatically updated log of the guard's movements).

D) Mobile Venues: Transceivers may be placed in mobile venues such as postal or commercial delivery vehicles so that special messages including sales coupons, special deals etc., can be transmitted to pedestrians' smartphones as the vehicles drive by in close proximity.

Generalization.

The forgoing description is but one example of the methods and systems of the present invention. More generally, the present invention provides a method for providing information to a user $u_i$ of a respective mobile device $m_i$. The method generally includes: (a) transmitting signal $s_i$ from a location $l_i$, where $l_i$ is positioned within a space and the signal $s_i$ includes an identification code $c_i$; (b) receiving the signal $s_i$ on mobile device mi of user $u_i$ located within the space in proximity to $l_i$ (as described more fully below, reception of the signal does not necessarily require pairing of the mobile device and the signaling device, nor does it necessarily require a positive acknowledgement of reception of the signal from the mobile device to the signaling device, thus differentiating the methods and systems of the present invention which require bidirectional communication channels in which such pairings or acknowledgements are required); (c) retrieving information ii from at least one server using $s_i$ (e.g., over the air via a cellular or other telecommunication network or wireless local area network or combinations thereof), wherein the information i retrieved by mobile device $m_i$ may be gated through a filter $f_i$; and, (d) displaying information $i_i$ on the mobile device $m_i$. The information $i_i$ may be a function of $f_i$ and $c_i$.

The present invention further provides a system for providing information to a user $u_i$. The system may include: (a) a transceiver operable to transmit signal $s_i$ from a location $l_i$, wherein $l_i$ is positioned within a space and the signal $s_i$ includes an identification code $c_i$; (b) a mobile device $m_i$ for a user $u_i$ located in proximity to $l_i$, wherein the mobile device $m_i$ is operable to receive the signal $s_i$; and (c) at least one server, wherein the mobile device $m_i$ is operable to retrieve information $i_i$ from the server using $c_i$, and wherein the information $i_i$ may be gated through a filter $f_i$, and displayed on the mobile device $m_i$. The information $i_i$ may be a function of $f_i$ and $c_i$.

The i for each component above can range from 1 to n, where n can be any integer. The value of i for each component may or may not affect or be affected by the other components. When n is greater than 1, the present methods and systems can involve multiple users, multiple transceivers, multiple signals, multiple locations, multiple location identification codes, multiple mobile devices, multiple pieces of information, etc.

Location $l_i$.

The location referred to above may be any entity that needs to broadcast information related to the entity. For example, the location provides a user with business information, marketing information, traffic conditions, informs a user of an event at a location, etc. Non-limiting examples of the location include a retail store (including a stand-alone retail store, a store located within a strip mall or a shopping mall), a restaurant, a hotel, a movie theatre, a tourist attraction a public facility, an airport arrival/departure gate or baggage claim area, a sporting event facility, an emergency relocation center or evacuation center, a tourist attraction, an event organizer, a convention center, a house for sale, a museum, a church, and a dealer (e.g., a car dealer), a place of business (e.g., a corporate campus, a hospital, a manufacturing facility, etc), or a vehicle (e.g., a car, a truck, a train a plane, etc.).

The location may be static or mobile. That is, the transceiver may be attached to an entity that is static or mobile. Static locations include a retail store, a building, an airport arrival/departure gate or baggage claim carousel, a restaurant, a temporary structure such as a booth or table at a trade show, craft show or convention, etc. Mobile locations include a food cart in New York City, a blood drive truck, a political candidate's campaign vehicles, an aircraft, an automobile, a ship, an unmanned drone vehicle, etc.

The space may be any defined space, in the shape of a sphere, a circle, a closed polygon, a closed volume, in two dimensions, in three dimensions or may travel with an object or a person. The size of the space may correspond with the effective range of the transmission technology, e.g., Bluetooth, etc. Any arbitrary boundary between one geographic area and another may define the space. For example, the space can be a town, a city, a shopping mall, a department store, a single store, etc. The boundary may be stationary or may move, for example if the transmitter is associated with a mobile location. The movement either may be correlated to the movement of a physical object such as the transceiver or may be determined arbitrarily. The space may have a center, which can be at or near the location of the transceiver. The space may have a radius, or a longest cross distance, of less than about 500 meters, less than about 200 meters, less than about 150 meters, less than about 100 meters, less than about 50 meters, less than about 40 meters, less than about 30 meters, less than about 20 meters, or less than about 10 meters.

Figure 2:
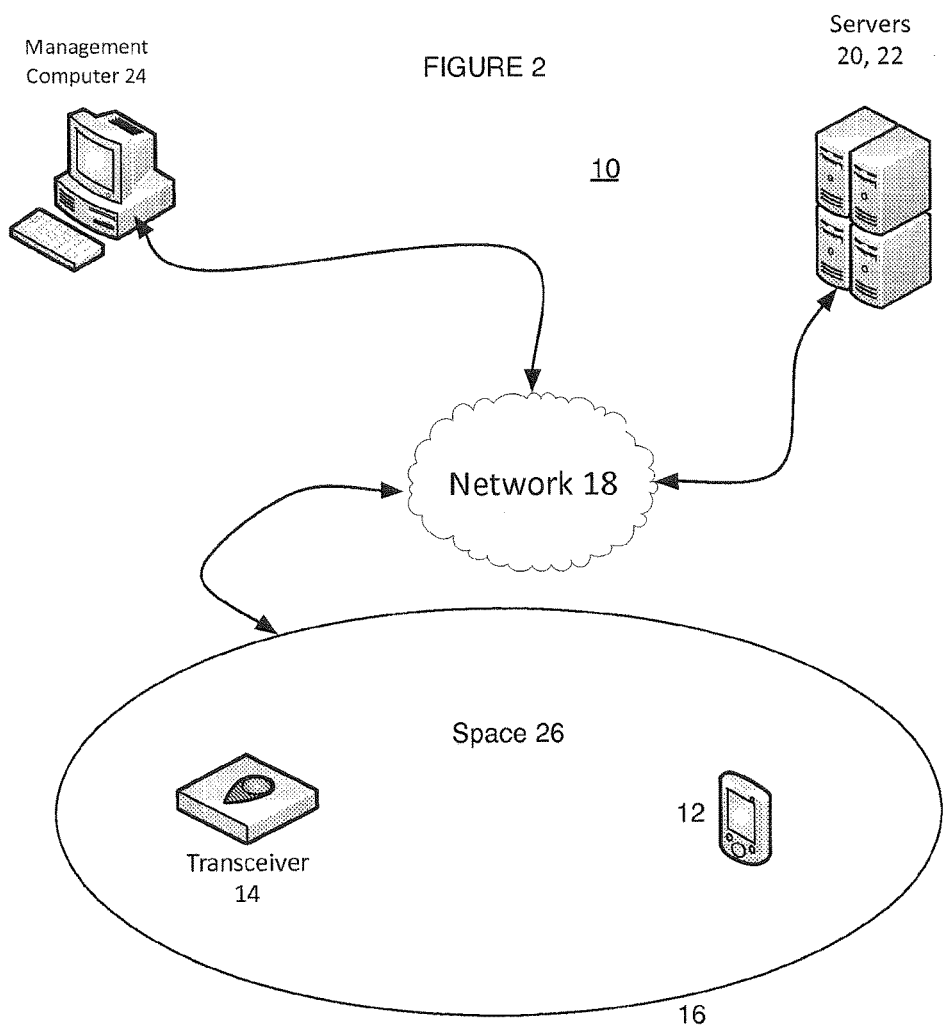
FIG. 2 is a diagram showing an example of a close proximity notification space consistent with an embodiment of the present invention.

An example of a space 26 is shown in FIG. 2. Space 26 is defined by boundary 16 (which may be regular or irregular). A mobile device 12 with a close proximity notification application installed thereon and a transceiver 14 are located within the space 26. Management console 24 can be positioned within or outside the space 26. Similarly, the server(s) 20, 22 can be positioned within or outside the space 26.

Signal $s_i$ transmitted to mobile device $m_j$.

The signal transmitted from a transceiver at a location to a mobile device may include a unique location identification code. The location identification code, $c_i$, may comprise positional information $p_i$ for the location $l_i$. The identification code may include any suitable combination of numbers, letters, alphanumeric characters, or symbols. Any suitable technique may be utilized to provide a unique code. By way of examples, any portion or all of the unique location identification code may correspond to one or more of the following: a MAC address, a telephone number, an Internet protocol (IP) address, or other hardware- or software-based serial number(s), etc. In some instances the location code may be or may be derived from user-specified information, such as a hash of a user-supplied location name and/or password, etc.

The transceiver can be any suitable transceiver that may be attached to a location or simply placed at a location. The transceiver may be self-contained, or may be part of another electronic device. The transceiver may be powered by at least one battery, and/or by external power. In one embodiment, the device is powered through an external low-voltage A/C-to-D/C adapter, and is mounted in close proximity to, or within, the coverage area (i.e., the space). For example, the transceiver can be adhered unobtrusively to a storefront window or door, or may be placed close to a storefront. The transceiver may be attached to the location by any suitable means, non-limiting examples of which include a double-sided tape, hook and loop fastener (e.g., Velcro™ fastener), a mechanical fastener (e.g., a wood or sheet-metal screw), glue, etc.

The signal $s_i$ can be transmitted from the locations $l_i$ using any suitable technology, including, but not limited to, Bluetooth, BLE (Bluetooth low energy) RFID (radio frequency identification), ZigBee™, Wibree™, UWB (ultra-wideband), WUSB (wireless USB), or other MAN (wireless local area network) technology. The signal $s_i$ transmitted from the locations $l_i$ may be limited to the effective range of the transmission technology. The effective range, strength, duration, frequency of the signal $s_i$ transmitted from the locations $l_i$ may change, and may be modified. The signal can be sent continuously or intermittently. For example, the transceiver can be configured to transmit signals continuously or periodically at all times of day, only during business hours, or on another schedule, and may operate so as to reduce its power consumption when not actively transmitting signals.

When a mobile device is located in proximity to the transceiver, the mobile device is able to receive and decode the transmitted signal. The effective reception distance which allows for such operation may be less than about 500 meters, less than about 200 meters, less than about 150 meters, less than about 100 meters, less than about 50 meters, less than about 40 meters, less than about 30 meters, less than about 20 meters, or less than about 10 meters, and may vary depending upon environmental conditions, mobile device user-specified preferences and/or transmitter-operator specified preferences.

Mobile device mi and close proximity notification application.

The mobile device can be based on any operating system, including, but not limited to Apple Inc.'s iOS™, Google Inc.'s Android™, Microsoft Corp.'s Windows Phone™, Nokia Corp.'s Symbian™, or Research In Motion Limited's BlackBerry™ operating system, or an embedded Linux operating system such as Maemo™ or MeeGo™. Non-limiting examples of mobile devices capable of being used in accordance with the present invention include, a mobile phone (which may or may not be a "smart" phone), a GSM-enabled mobile phone, a CDMA-enabled mobile phone, a GPRS-enabled mobile phone, a mobile phone with a camera, a mobile phone with browser capabilities, a portable GPS (Global Positioning System) unit (whether embodied as a mobile phone or otherwise), a tracking unit, a portable computer system (such as a laptop computer, notebook computer, netbook computer, tablet computer, mini tablet computer, or other portable computer system), a personal digital assistant (PDA), an portable audio or audio-video player, a portable camera, a pager, a portable gaming device, an electronic watch, an electronic keychain fob, or other device capable of executing the close proximity notification application or having dedicated hardware for performing the operations thereof.

The close proximity notification application is, in one embodiment, intended for download and installation on a compatible mobile device. When installed and running on the mobile device, the application may provide notifications to the user of the mobile device as he/she moves into proximity of a transceiver. These notifications may be delivered under a "push" paradigm, without need for a user to specifically request same before they are delivered. For instance, a push notification may advise the user that he/she has received a promotional offer from a participating retail store located in close proximity (i.e., within the effective reception distance discussed above to the user.

In some instances, the notification requires no response from the user. He/she can choose to visit the associated establishment or not. In other instances, the notifications may be invitations to visit an associated web site or download additional materials. By accepting such an invitation, the mobile device (e.g., the close proximity notification application, a browser or other application), may make one or more calls for additional materials from specified locations (e.g., URLs and the like) and such materials may be delivered to the mobile device for review by the user. Such materials may include further details of the participating retail store's promotion, interactive games, information concerning flight status or sports scores, or other information. If more than one promotion notification has been accessed and is available for viewing, scrolling or other gestures may be employed to view the additional promotions. Promotions may also be deleted or saved for future viewing. Disabling the close proximity application (e.g., either by turning it off, selecting a feature or uninstalling the application) may stop delivery of the notifications or may simply stop notification of the user, while the promotions continued to be received and stored in the background (e.g., for review by the user at a time of the user's choosing).

The mobile device application may allow a user to search for desired information, such as desired services, including promotions provided by retail stores. The search can be based on criteria such as the user's location (e.g., location information provided by GPS facilities associated with the mobile device or as obtained from mobile telecommunications or wireless local area networks, or more coarse location information such as user-supplied zip codes and/or addresses), shopping preferences, social network or other personal profiles (whether of the user, the user's friend(s) or others), etc. In one embodiment, the search page may have two screens; a first screen configured to accept user-specified search criteria, and a second screen to provide search results. In other instances, more or fewer screens may be employed for these purposes.

Figure 3:
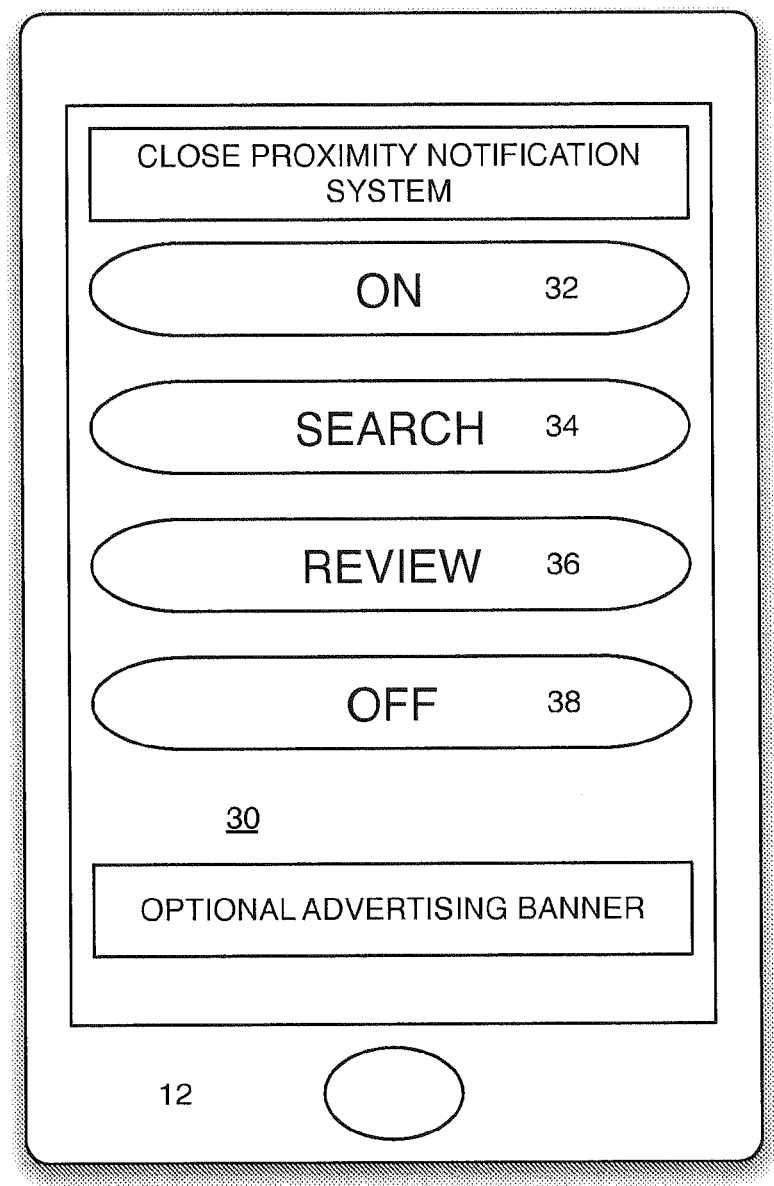
FIGS. 3 through 7 show various examples of screens of a mobile device close proximity notification application consistent with embodiments of the invention, in particular.

FIG. 3 illustrates an example of a graphical user interface for an embodiment of the close proximity notification application, as may execute on a mobile device. In particular, this example illustrates a "home" screen 30 configured to permit the user to access any of three primary functions:

1) On (32): activates the application to facilitate receipt of push notifications (and subsequent notification of the user) as the user conies into proximity of a transceiver deployed by a participating retailer or other provider;
2) Search (34): when selected, allows the user to execute location-based searches (or searches based on other or more criteria) and receive results indicating participating retailers and/or other providers; and)
3) Review (36): facilitates user review of previously saved promotion materials.

An off button 38 is provided to allow the user to disable the close proximity notification application. In some instances, the application may continue to download promotion materials in the background even after the off button is selected, provided that the mobile device can access the necessary communications networks. In other instances, no promotion materials will be received after the off button is selected, and the application will remain in this "off" state until the on button 32 is selected.

Figure 4:
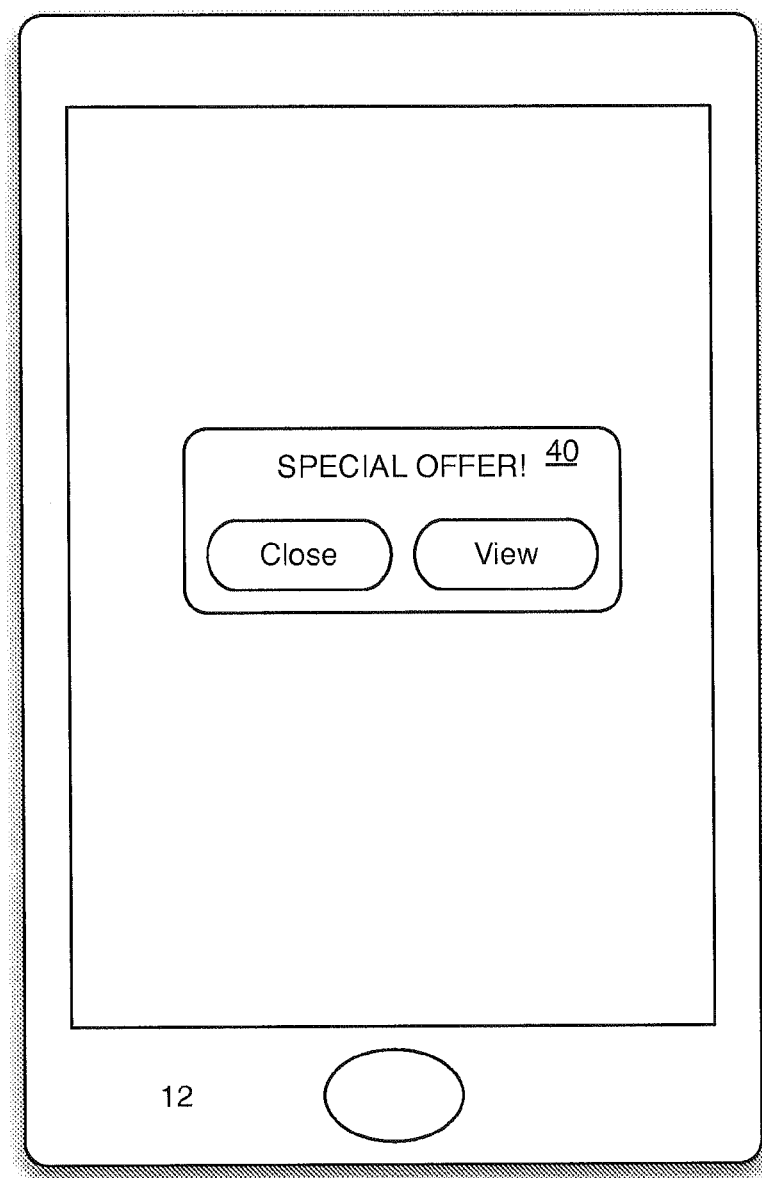
Figure 5:
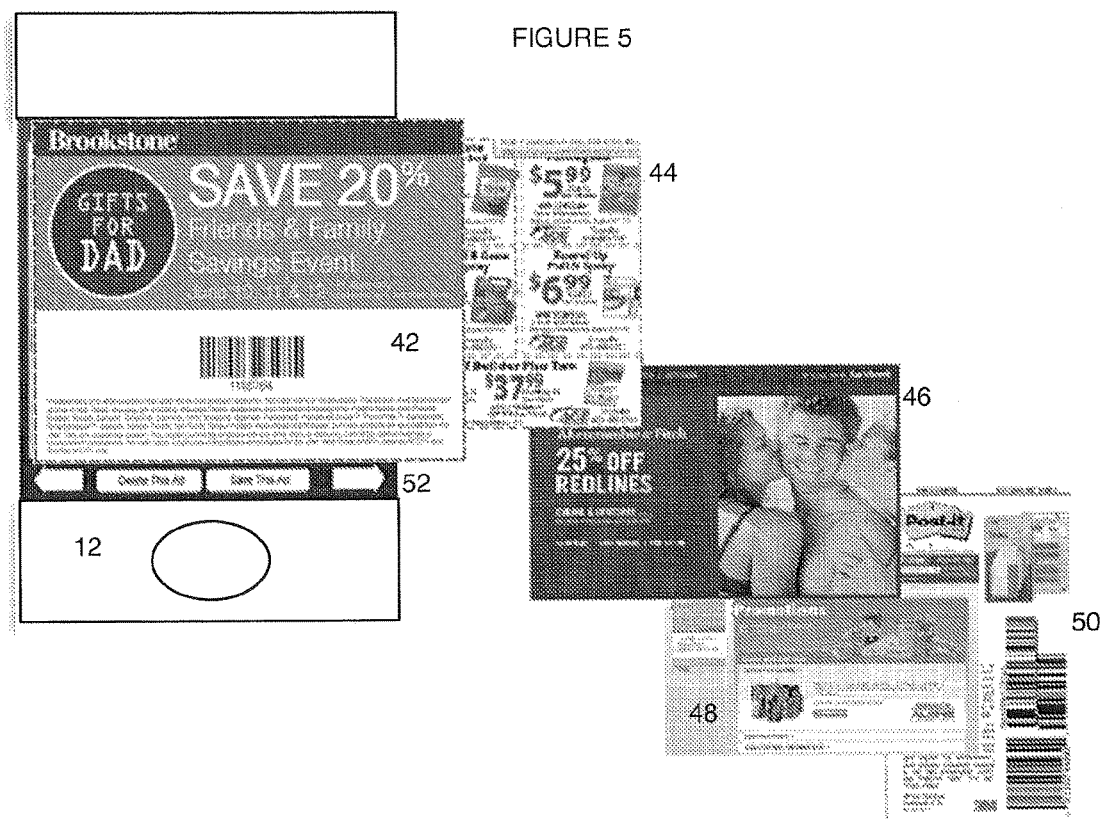

FIG. 4 illustrates an example of a notification 40 displayed for a user of mobile device 12 when a push notification has been received. The notification 40 may be displayed together with an audible and/or physical alert to the user. As shown, the notification may permit user interaction, through use of a prompt for the user to obtain further information. If the user accepts the invitation to "view" further information, the close proximity notification application or a browser on the mobile device will open and begin downloading promotion information from the specified address as described above. As shown in FIG. 5, this promotion information may include any or all of coupons 42, flyers with advertised offerings 44, web pages displaying sales promotions 46, etc. The coupons may be printable, as in the case of coupon 48, or may include bar codes or other optical machine-readable representations of data capable of being displayed on mobile device 12 for presentment at a point of sale, as in the case of coupons 42 and 50.

Figure 6:
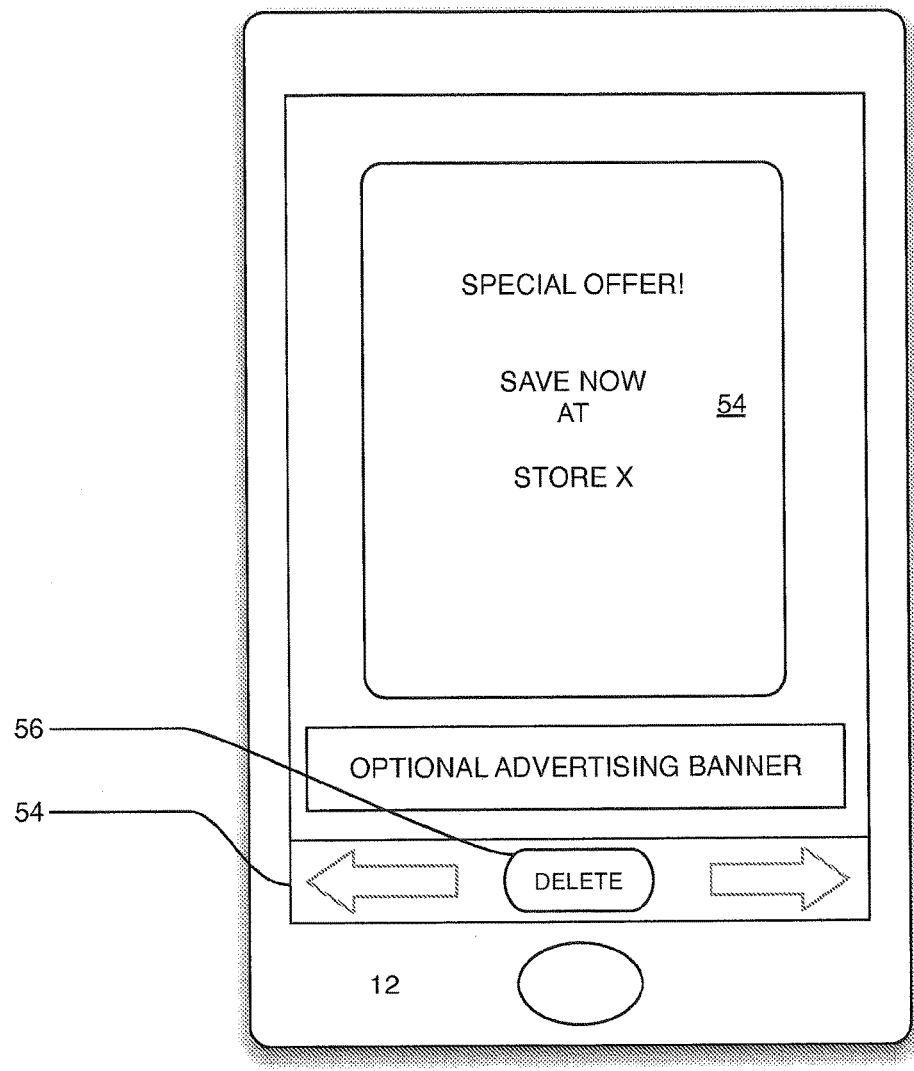

As shown, when promotion materials have been downloaded, the home page 30 may be enhanced to include a navigation toolbar 52 that allows a user to scroll or otherwise review previously stored promotions. When a promotion 54 is selected for viewing, as illustrated in FIG. 6, it is presented on the display of mobile device 12 and the toolbar 52 may be configured with a delete button 56 that allows the user to delete the displayed promotion.

Figure 7:
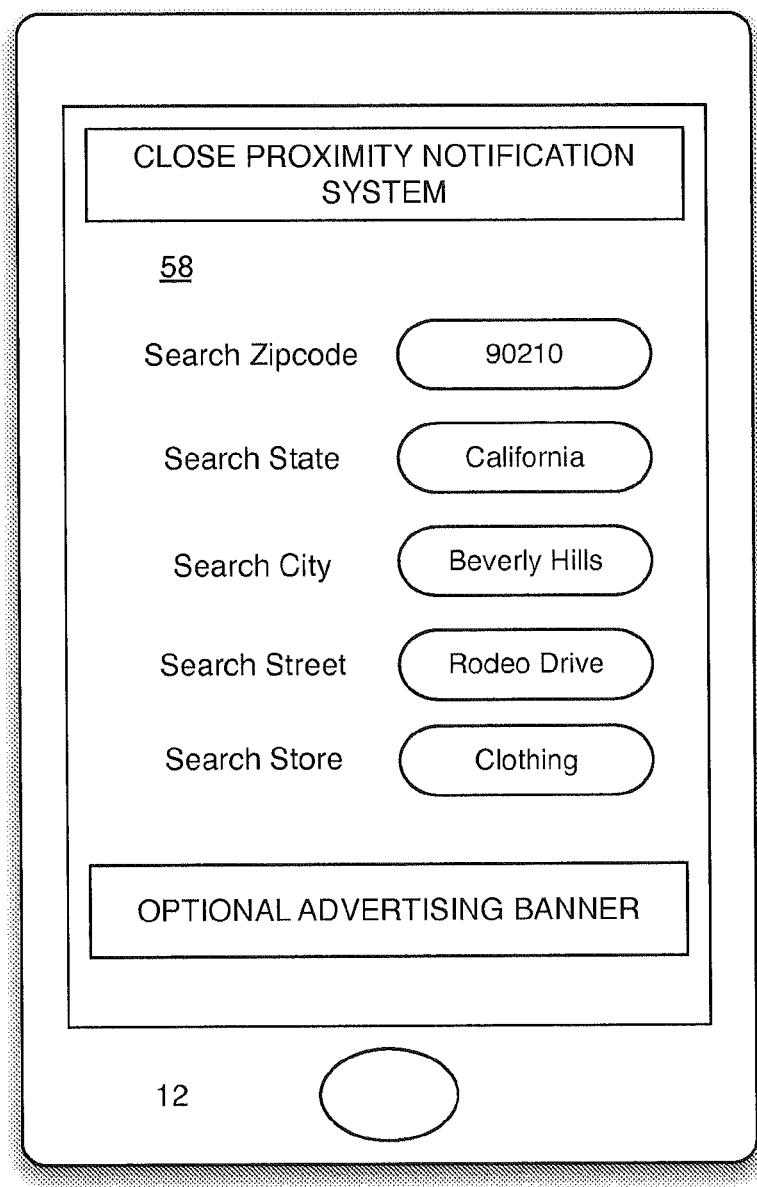

FIG. 7 illustrates an example of a search interface screen 58 for the close proximity notification application of the kind mentioned above. Screen 58 allows a user user to specify search criteria, such as a zip code, state, city, street and store type, etc. The specification may be made by entering text into text boxes and/or selecting from prepopulated lists using dropdown menus and the like. Such menus may be populated based upon information entered by the user. For example, in response to the zip code or city and state information, the store type list may be populated to include those types of establishments that are nearby the specified zip code or city and which participate in the close proximity notification system. In other embodiments, multiple store types may be selected at a single time. Results may be returned on a separate screen (not shown) or may be displayed in an area of screen 58 reserved for such items (not shown). Facilities for scrolling through or otherwise reviewing the results may be provided. Likewise, facilities to include advertising, e.g., in the form of a banner or otherwise, may be included in one or more of the screens of the close proximity notification application. So too many features that enable shoppers to make purchases from participating retailers from their mobile devices be included.

Operation of transceiver.

Figure 8:
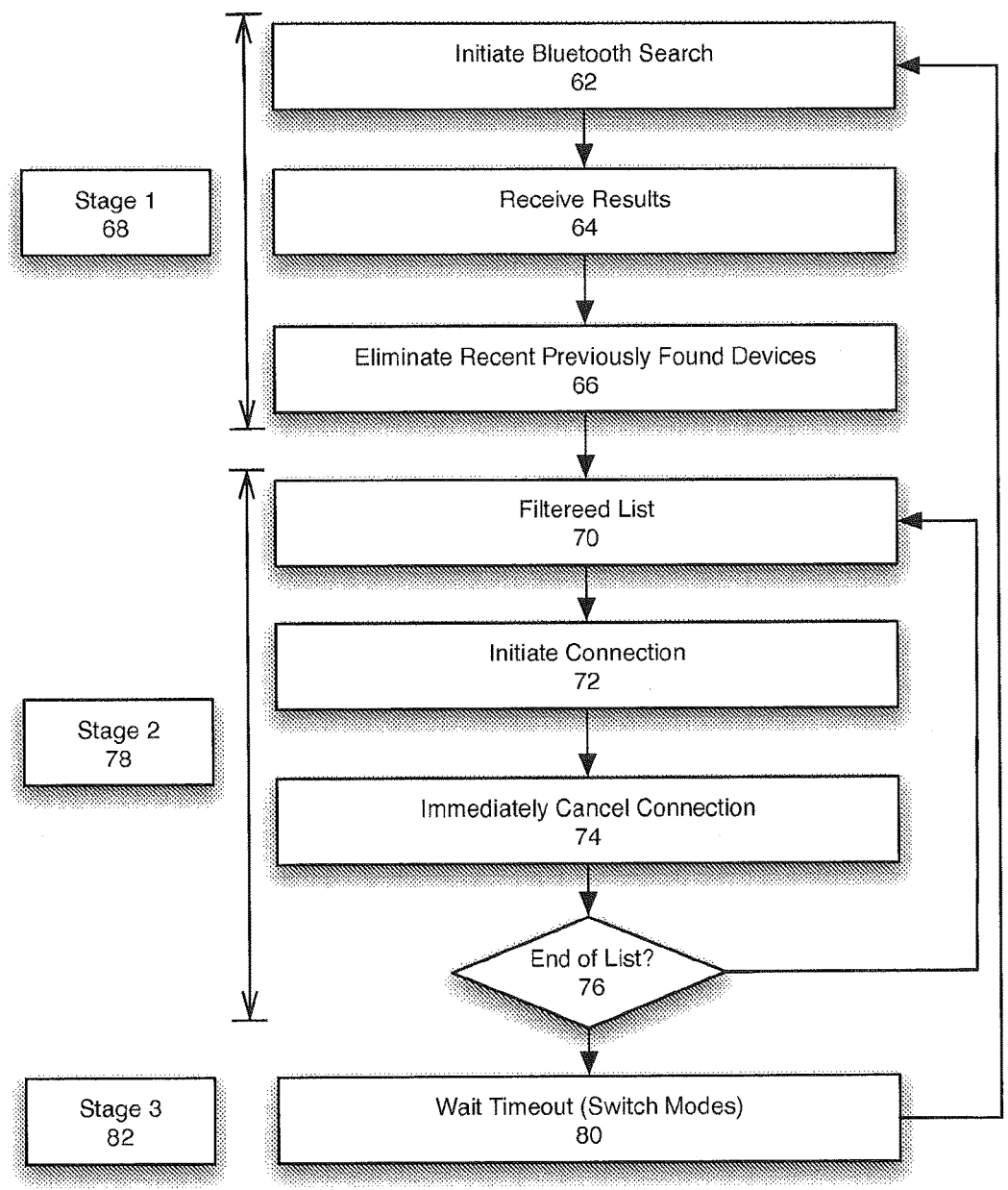
FIG. 8 is a flow chart showing an example of a discovery application for a transceiver configured in accordance with an embodiment of the present invention.

FIG. 8 illustrates, in the form of a flow diagram, the operation of the transceiver deployed at location li, for example for use with Android-based mobile devices. This operation, in the form of procedure 60, may be instantiated in firmware in the transceiver, may represent the operation of application software running on the transceiver, or combinations of both. In such instances, the transceiver may include one or more processing units and related hardware so configured as to execute these operations. In some instances, similar processes targeted at mobile devices running other operating systems may execute (in serial or parallel fashion with respect to procedure 60) on the transceiver. That is, the transceiver may include a single processing unit that executes multiple procedures to discover mobile devices of different operating systems or a single procedure that includes steps to discover mobile devices of different operating systems, or multiple processing units, each of which executes a single procedure to discover mobile devices of one operating system, multiple procedures to discover mobile devices of different operating systems or a single procedure that includes steps to discover mobile devices of different operating systems. Thus, procedure 60 is provided merely for purposes of illustrating an example of the device discovery process and should not be viewed as the exclusive means by which such discovery may be performed.

Procedure 60 begins with the transmitting unit initiating a search 62 for nearby compatible Bluetooth devices. In the case where the transmitting unit uses the Bluetooth communication protocol, the search is for other Bluetooth compliant units in proximity to the transceiver. Further, the search parameters may be configured so that only Bluetooth devices of a specified class or classes are discovered. This may assist, for example, in discriminating between mobile devices, such as mobile phones and the like, that are capable of and likely candidates for running the close proximity notification application and other devices, such as Bluetooth compliant headsets and the like, which are not.

Results of the search are returned at step 64 and the results parsed to remove and previously discovered devices 66. For example, the transceiver may maintain a cache (e.g., configured as a circular buffer or other data structure) in which are stored identifiers for mobile devices discovered during previous iterations. The length of time that such information may be stored in the cache may be determined on the basis of time, number of discovered devices, size of the cache and/or other parameters or combinations thereof.

The result of this first stage 68 of process 60 is a list 70 of discovered mobile devices in proximity to the transceiver. For each such device, instructions are transmitted for the mobile device to contact the application server from which information needed to retrieve promotion materials may be obtained. This provision of instructions 72 may include the MAC address or other unique identifier of the transceiver, as discussed above.

As illustrated in the diagram, the instructions transmitted by the transceiver may be sent as part of a connection request, but where so provided the connection request is terminated 74 prior to an actual pairing with the target mobile device. That is, no actual pairing between the transceiver and the target mobile device is necessary, instead, the transceiver need only broadcast its unique identifying information and then terminate the connection request without waiting for a reply. Formal pairing of Bluetooth devices typically requires a user to accept a connection request (e.g., by providing a pairing code or other information). If such actions were required for the operation of the present close proximity notification system, users may view it as intrusive and may fear that personal information was being extracted from their device or that some other malicious operation was occurring and so may reject the connection request. By requiring only that the transceiver broadcast its identifying information and not actually pair with the mobile device, the need for user involvement (and the potential refusal of same) is eliminated.

For mobile devices that do not have running close proximity notification applications, the identifying information broadcast by the transceiver will be ignored. For those mobile devices which are running the close proximity notification application, however, this information will be stored and used to contact the application server 20 as described in greater detail below. The process of initiating connections, broadcasting the transceiver identification information and then terminating the connection request continues until attempts to provide all of the mobile devices in the current list of newly discovered mobile devices have been made 76. Thereafter, the transmitting unit may execute a third stage 82 of procedure 60. This third stage may involve waiting a predetermined time period 80 until once again starting a new discovery stage, switching to a discovery operation that targets mobile devices of a different operating system, or other function.

Communication between mobile device $m_i$ and server(s).

The mobile device $m_i$ may be in wireless communication with the various servers described herein. The communication may be via a mobile device telecommunications network provider, and/or through a public and/or private network, such as a wireless local area network, etc. The information may be transmitted via any convenient communications protocol, for example as an SMS (e.g., text) or MMS message, a facsimile transmission, an email message, an instant message sent via any of a number of communications applications, a voice message, an HTTP or other post, or as a file uploaded to the server.

Transmissions to and/or from a mobile device may be adjusted. For example, the length or frequency of the transmissions may be varied. The variation may be in response to velocity, direction, location, a point of interest, an object, and preferences. The variation may result in increased battery life for the mobile device. The data may be stored and transmitted all at once or transmitted as it is updated.

Multiple mobile devices and multiple locations can connect to the servers. For example, a laptop can connect to a modem to access the database server. Alternatively, a laptop can connect to the network over an Ethernet or other broadband connection. Additionally, a variety of wireless networks can be utilized to facilitate client-server communications. For example, a laptop or tablet computer system or PDA can connect via an internal cellular modem or cellular modem included on a network interface card, or a wireless local area network through use of a wireless communication protocol such as Bluetooth or WiFi (i.e., a protocol compliant one or more of IEEE 802.11 a/b/g/n, etc.).

Figure 9:
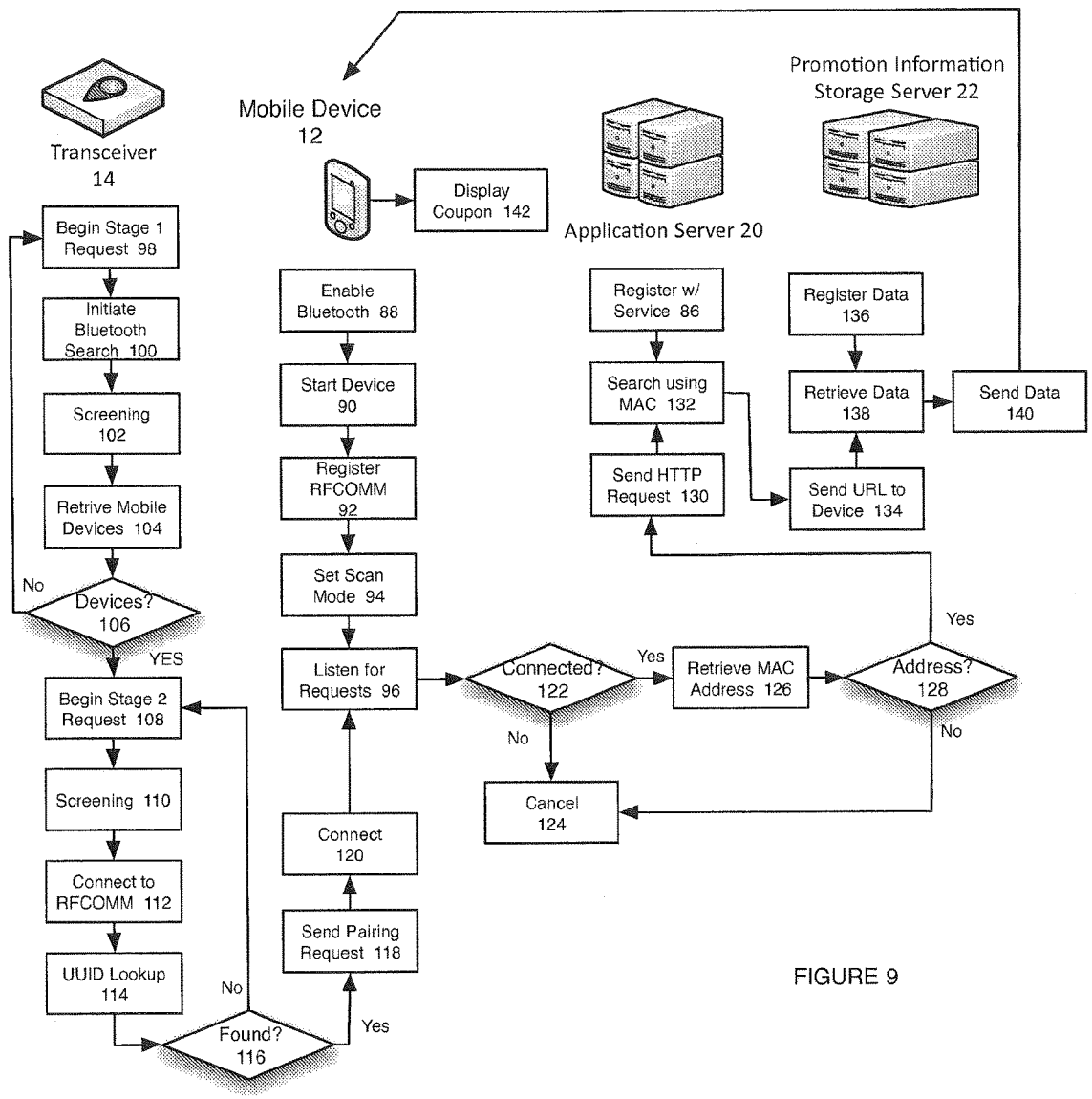
FIG. 9 is a flow diagram showing one example of end-to-end communication in a close proximity notification system configured according to one embodiment of the invention.

FIG. 9 illustrates one example of end-to-end communications involving a transceiver, a mobile device and one or more servers, in accordance with one embodiment of the present invention. This procedure 84 may be especially well suited for mobile devices running the Android operating system, but may be more broadly applicable to other mobile devices as well.

Some time prior to the mobile device 12 coming into proximity of the transceiver 14, a retailer or service provider will have registered 86 with the close proximity notification service. As discussed above, this will involve, among other things, the association of the transceiver unique identifier with an address at which stored promotion material for the retailer or service provider may be obtained (e.g., a URL associated with a promotion material storage server). In addition, a copy of the close proximity notification application will have been installed on mobile device 12 and will be running (either in the application space foreground or background) so that it can be responsive to communications from the transceiver 14. This includes enabling Bluetooth (or other short-range wireless) communications facilities on the mobile device 88 and setting the Bluetooth status of the device to be discoverable 90. In addition, for an Android-based mobile device, the close proximity notification application registers a secure RFCOMM Bluetooth socket that listens for incoming connections by assigning an unused RFCOMM channel to listen on 92. A remote device connecting to this socket will be automatically authenticated and communication on this socket will be established. Once the socket is registered, the close proximity notification application may set an appropriate register to monitor Bluetooth scan mode changes 94. In this way, the mobile device will be set to listen for and react to incoming Bluetooth requests on the established RFCOMM channel. Thus, the mobile device will be in a listening mode 96 with respect to Bluetooth connection requests.

Meanwhile, the transceiver 14 executes the discovery procedure discussed above. For example, the transceiver may begin the first stage of the discovery process 98 by initiating a Bluetooth search for nearby mobile devices 100, screening any found devices 102 so that only devices of the appropriate class 104 are discovered. This process continues until the mobile device 12 (which is of the appropriate Bluetooth class, comes into proximity and is recognized 106. At this point, the second stage of the transceiver routine begins 108 and a check is made to see if the discovered device is one that was previously seen 110. If not, the transceiver 112 connects to the mobile device 112 and retrieves a universally unique identifier (UUID) 114 to determine whether the mobile device is listening on the channel assigned for use by the close proximity notification service 116. If not, other devices are tested and, if there are no other discovered devices, the transceiver proceeds to its stage 3 (not shown in detail in this illustration). For a discovered device that is determined to be listening on the correct channel however (i.e., indicative of the device running the close proximity notification application), a pairing request is sent 118 and a connection to the Android-based mobile device initiated 120.

Recall that the mobile device is listening for such connection requests 96, and upon recognizing the incoming request a connection with the transceiver is attempted 122. If the connection is unsuccessful, it is cancelled 124. However, if the connection is successful, the Mac address or other unique identifier of the transceiver is retrieved 126. As indicated above, this process of obtaining the MAC address does not require a full pairing of the transceiver and mobile device. Instead, once the MAC address is broadcast as part of the pairing request, the transceiver may terminate the connection process. The mobile device determines whether a complete MAC address has been received 128, and if not simply terminates the connection 124.

If a complete MAC address of the transceiver was received, the close proximity notification application running on the mobile device sends an HTTP or other request to the application server 20. The request may include the MAC address of the transceiver and upon receipt of same the application server 20 may search for the associated URL information at which the promotion material is stored 132.

The URL or other address information is returned to the mobile device and the mobile device (i.e., the close proximity notification application) uses the URL information to contact the promotion material storage server 134. The promotion material will have been previously registered 136 with the promotion material storage server 22 and that promotion material will be retrieved from the URL presented by the mobile device 138 and subsequently provided to the mobile device 140. Upon receipt of this promotion material, the mobile device 12 displays the promotion material to the user 142. In some cases, what is displayed is a prompt for the user to obtain further promotion material.

Figure 10:
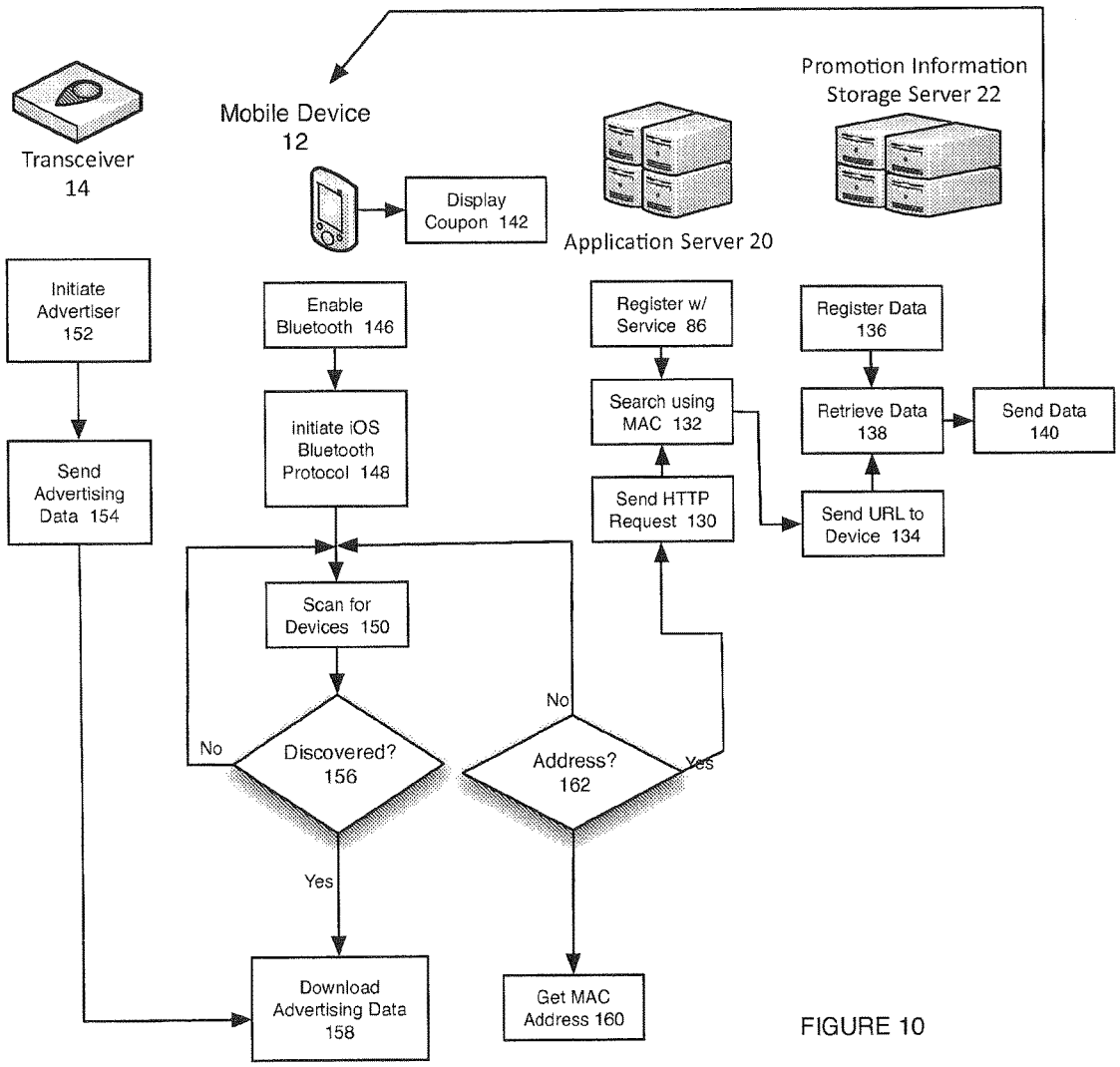
FIG. 10 is a flow diagram showing another example of end-to-end communication in a close proximity notification system configured according to one embodiment of the invention.

FIG. 10 illustrates an alternative procedure 144 for providing close proximity notifications to mobile devices, in particular, a procedure well suited for mobile devices running an iOS operating system. Recent versions of the iOS operating system include Bluetooth communication facilities that can be exploited to make the overall notification process more streamlined than is the case for Android-based devices. iOS-based mobile devices 12 will have a version of the close proximity notification application installed and the application will enable Bluetooth communication facilities 146 and protocols 148 in order to initiate a scan for other Bluetooth devices 150.

For its part, the transceiver 14 may employ BLE technology and use same to "advertise" its MAC address. That is, the transceiver 14 may be powered on and running as an advertiser initiator 152 to send its MAC address as advertisement data 154. When the mobile device 12 comes in proximity to the transceiver 14, it will discover the advertiser 156 and download the advertisement data from the transceiver 158. If necessary, the close proximity notification application may then parse the advertisement data for the transceiver's MAC address and upon successfully obtaining same 162, initiate a connection with the application server 20. From this point forward, the procedure is similar to that discussed above for the Android-based device.

Server(s).

A system according to the present invention can contain one or more of the following: a database server for data storage; an application server, and a Web server. There may be only one (or one type of) server serving as both a database server and an application server (and a Web server). There may be more than one (or more than one type of) server. For example, there are a database server and an application server. Non-limiting examples of the application server include the Google AppEngine server. Non-limiting examples of the database server include the Amazon S3 storage server. The database server may include a set of tables each defining specific data fields and containing data records within each table. Certain tables include data fields that associate a specific record with one or more locations. The data fields may further specify a period of time during which the record is associated with the locations. It should be clear to one of ordinary skill in the art that these servers may exist as one computer, as independent computers, as a network of workstations, as a cluster computer, as a part of a three-tier configuration such as a. Web client connected via the Internet to a plurality of Web servers and application servers connected to one or more database servers, and so forth.

The data that are stored on the server can be so stored in any suitable format, non-limiting examples of which include an open data file format, a closed data file format, binary format, ASCII format, XML, HTML, SVG, TXT and DAT.

The application server may or may not provide a means for comparing filter or search criteria of the mobile device user with the information provided by the location(s), and for determining when the information of location(s) sufficiently satisfies or matches the filter or search criteria. When such a match has been determined to exist, the application server transmits, via the Internet, matching information (e.g., coupons of a specific store information sufficient for the mobile device to obtain same, to the mobile device.

Information ii provided by a location li and stored on a server.

The information $i_i$ can be any information that a location would like to broadcast. Non-limiting examples of the information $i_i$ include, advertising information, a coupon, availability of commercial goods, a menu of a restaurant, information on an event, educational information, traffic information, plane/train/bus/subway departure/arrival information, business information, information related to a public facility, conference/meeting information, corporate information, health information, information provided and/or related to a hospital, information provided and/or related to a manufacturing facility, security information, weather, etc. The information $i_i$ may be time-sensitive. In one embodiment, the information $i_i$ is on a service provided to the user $n_i$.

The management system is preferably implemented as a software-based system. The location (e.g., a retail store) can use an Internet-based software application (i.e., a management console) to access and easily make changes to its account. Therefore, the location can manage its account and modify information desired to be displayed on a user of a mobile device and schedule the display from any computer, including, e.g., a personal computer. In one embodiment, the management may be achieved via a store administration panel having access to an application server (e.g., Google AppEngine servers) that may be located at a remote location.

The management system software provides through a Web browser interface a number of tools that assist a location in planning, inputting, and managing information to be broadcast. In relevant part, the management system software can assist a location with maintaining up-to-date information. The management system software may include additional features that can assist a location in other ways, such as managing inventories for a retail store, and in scheduling future information delivery. The computer used by the location includes a suitable complement of hardware and software including, by way of example, a processor, memory, an accessible database, communications equipment, and input/output devices.

Figure 11:
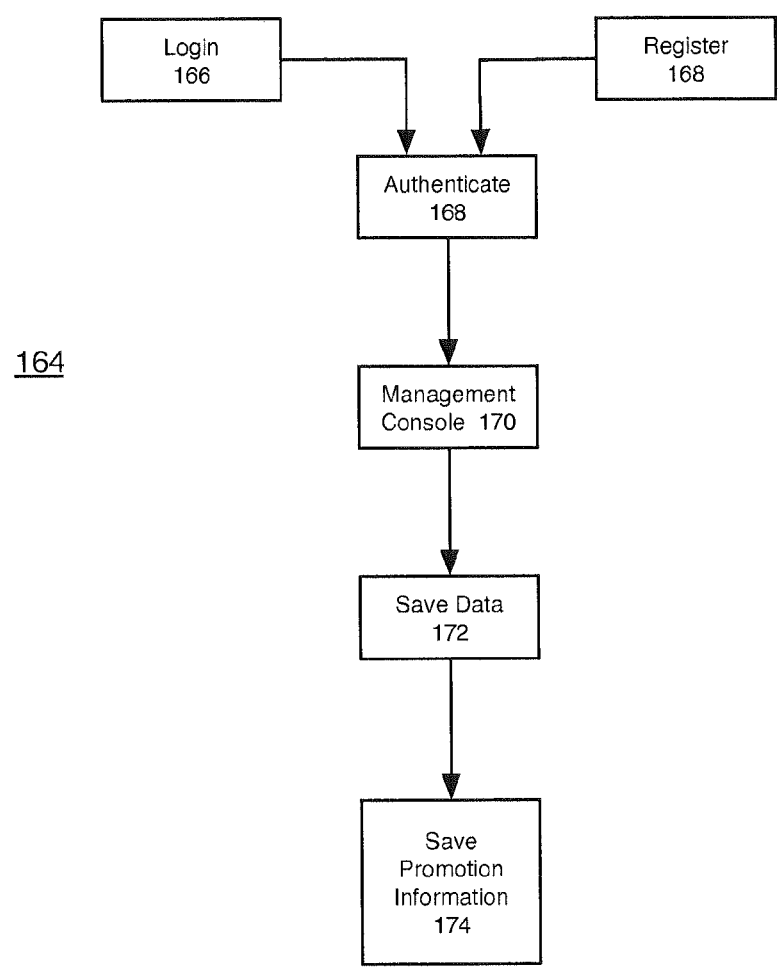
FIG. 11 is a flow diagram illustrating a process for managing promotions in accordance with embodiments of the present invention.

FIG. 11 is a flow chart showing one example 164 of how a location can manage the information to be delivered to a user of a mobile device. If a location is registered and has an existing account, an administrator can visit an appropriate Web site and enters associated log in credentials 166. If the location is not yet registered, then a registration process 168 may have to be completed before the administrator can proceed. The login credentials are authenticated 168 and upon successful authentication the administrator is presented with a management console 170. Via the management console, promotion materials can be created, uploaded, designated, etc., and advertising campaigns specified 172. This data is saved and any associated promotion materials stored to or indexed at the promotion material storage server 174.

Figure 12:
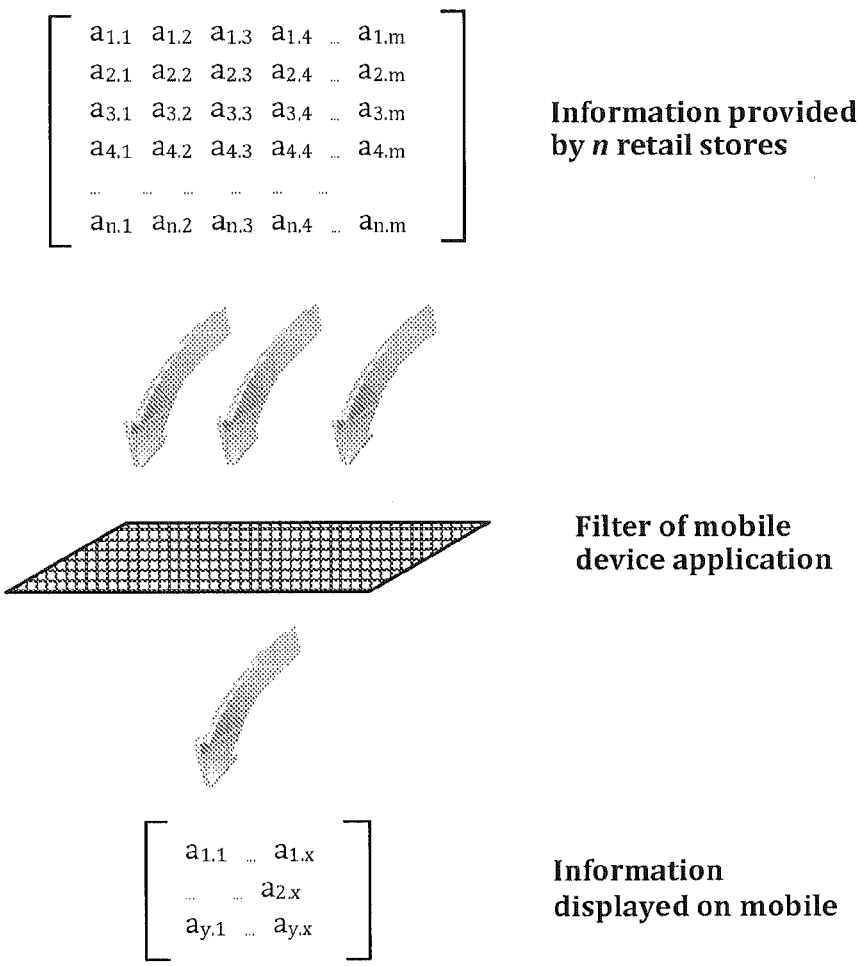
FIG. 12 depicts a process for filtering information displayed on a mobile device.

FIG. 12 depicts a process for filtering information displayed on a mobile device.

A user may choose to receive selected information based on his or her preferences by setting up a filter. Alternatively, or in addition, filters may be established automatically based on analysis of a user's shopping habits, social media profiles, previous interactions with notifications, and/or other factors. As a result, only desired information or information believed to be of interest to the user will be transmitted to or displayed by (e.g., in the case where the filters run only at the mobile device) the mobile device. For example, when multiple retail stores upload information to the server(s) a mobile device-based filter may gate the information based on the users preset preferences so that only filter-compliant information is displayed on the mobile device.

The filters may be user-defined. For example, the filter, $f_i$, can contain criteria, $cr_i$, for the user, such as shopping preferences and position preferences. The filter may be modified automatically by the close proximity notification application based on user's previous viewing preferences. A user may manually modify the filter; and/or choose to have the filter updated automatically based on user's viewing preferences or behaviors. The update of the filter may occur any time or when a user stops near a location. The filter may be modified anytime. The filter may be turned on or off anytime.

The present methods and systems may tailor information based on the observed behavior of a user. The information may be analyzed before being presented to the user on a mobile device. The analysis may take into account the user's past actions (e.g., purchasing information, personal preferences, viewing habits, spending habits). The analysis may utilize information associated with past use of the mobile device; the analysis may also retrieve information associated with the user from other servers (e.g., information provided by other vendors on the user). The analysis may also take into consideration the gender and age of the user, as well as information related to a specific location such as demographic information.

The filter may be part of the application installed on the mobile device or may be resident on the server(s).

Information retrieved from a server and displayed on a mobile device.

The mobile device mi can have a software application for managing the information ii so that the information can be easily saved, categorized, grouped, marked, deleted or viewed later. The output format of such information may, without limitation, be visual, audio, vibration, a message, an animation, or other form of content. An alert, which may relate to an item on a list, may be triggered in response to the information. Graphical user interfaces may also be used to present of points of interest on a mobile device.

The information $i_i$ is displayed on the mobile device $m_i$ with or without a user-implemented prompt. The information may refresh based on proximity to a location, continuously, in accordance with preset preferences, or in response to a request. A user may also adjust the frequency with which a mobile device obtains and/or updates information.

As indicate above, the close proximity notification application will listen for short-range wireless communications and, upon receiving such a communication, will attempt to obtain a unique identifier from the transmitter associated with that signal. If a unique identifier is retrieved and validated, the application will check for network connection. If the connection is available and the application can make HTTP requests, the app will attempt to make an HTTP request to a server, where data is hosted. The application will download and validate the data and ultimately will display the data to the user of the mobile device.

Sometimes, when the user sees the information displayed on the mobile device, he/she would like to take a corresponding action. Accordingly, the mobile device mi may comprise a means for the user to take an action based on the information $i_t$. For example, the action may be to make a purchase, prepay for a service, make a reservation, request a catalog or additional information/clarification, forward the information to other people, etc. A network of mobile devices may be provided, allowing communication among mobile devices, including sharing coupons and negotiating a lower price with a service provider based on the volume of potential purchases.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Further the procedures described herein may involve the use of various computer systems and computer readable storage media having computer-readable instructions stored thereon. FIG. 13 provides an example of a computer system 176 that is representative of any of the mobile device, computer systems or servers discussed herein. Note, not all of the various mobile devices or computer systems may have all of the features of computer system 176. For example, certain of the servers discussed above may not include a display inasmuch as a client computer communicatively coupled to the server may provide the display function. Such details are not critical to the present invention. Computer systems such as computer system 176 may be referred to by other names, for example as hand-held devices, mobile devices, smart phones, multiprocessor systems, microprocessor-based electronic devices, digital signal processor-based devices, networked computer systems, minicomputers, mainframe computers, personal computers, servers, laptop computers, tablet computers, and the like. Such labels are not critical to the present invention.

Computer system 176 includes a bus 178 or other communication mechanism for communicating information, and a processor 180 coupled with the bus for processing information. Computer system 176 also includes a main memory 182, such as a random access memory (RAM) or other dynamic storage device, coupled to the bus for storing information and instructions to be executed by the processor. Main memory 182 also may be used for storing temporary variables or other intermediate information during execution of instructions to be executed by processor 180. Computer system 176 further includes a read only memory (ROM) 184 or other static storage device coupled to the bus for storing static information and instructions for the processor 180. A storage device 186, which may be one or more of a hard disk, flash memory-based storage medium, or other storage medium, is provided and coupled to the bus 178 for storing information and instructions (e.g., operating systems, applications programs and the like).

Computer system 176 may be coupled via the bus 178 to a display 188, such as a liquid crystal or light emitting diode display, for displaying information to a user. An input device 190, such as a keyboard including alphanumeric and other keys, is coupled to the bus 178 for communicating information and command selections to the processor. In some embodiments, the keyboard will be a software construct rendered via a touch screen display 188. Another type of user input device is cursor control device 192, such as a mouse, a trackball, or cursor direction keys for communicating direction information and command selections to processor 180 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 180 executing appropriate sequences of computer-readable instructions contained in main memory 182. Such instructions may be read into main memory from another computer-readable medium, such as storage device 186, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 180 and its associated computer software instructions to implement the invention. The computer-readable instructions may be rendered in any computer language including, without limitation, C#, C/C++, assembly language, markup languages (e.g., HTML, SGML, XML, VoXML), and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 176 or similar electronic computing device, that manipulates and transforms data represented as physical (electronic) quantities within its registers and memories into other data similarly represented as physical quantities within its memories or registers or other such information storage, transmission or display devices.

Computer system 176 also includes a communication interface 194 coupled to the bus 178. Communication interface 194 provides a two-way data communication channel with a computer network, such as network 18 in FIG. 1, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 178 can send and receive messages and data through the communication interface and in that way communication with hosts accessible via the Internet. Computer system 176 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 176, and are often characterized by having storage mediums capable of accommodating significant amounts of information.

FIG. 14 illustrates an embodiment of a computer system 176 from the point of view of its software architecture. Computer system 176 may be any of the servers referred to above or, with appropriate applications comprising a software application layer 196, may be a mobile device or a personal computer for use with the management interface. The various hardware components of computer system 176 are represented as a hardware layer 198. Operating system software 200 abstracts the hardware layer and acts as a host for various applications 202a-202m that run on computer system 176. In the case of a server, the operating system may act as a host for a matching and decision engine 204, which is configured to perform the processes described above (e.g., to associate a MAC address with a URL for promotion information). For a server, the operating system may host a web server application 206, which provides access from the mobile devices via web browsers, etc. Such a web server may also be hosted on server to provide an interface by which a personal computer 24 may communicate with the server for performing management and administration functions. In the case of a mobile device, the operating system acts as a host for a close proximity notification application 208, but not (typically) a matching and decision engine or (typically) a web server.

As alluded to above, network 18 may include the Internet and the various servers and mobile devices communicatively coupled thereto may include computer systems, such as computer system 176, that are made up of one or more processors, associated memory (typically volatile and non-volatile) and other storage devices and peripherals that allow for connection to the Internet or other networks. The precise hardware configuration of the hosting and mobile device resources is generally not critical to the present invention, nor are the precise algorithms used to implement the services and methods described herein. Instead, the focus is on the nature of the services provided by the present invention.

Thus, methods and systems for location-dependent provision of information to a mobile device have been described.

Embodiments described herein advance a distributed data model with transceivers and wireless communication devices sharing data and information. Embodiments are directed to having the data and information as close to the user as logically and technically possible. This allows flexible architectural models for the processing and storing of data on the transceivers and/or wireless communication devices. In some contexts, data is used to refer to unorganized facts and figures, while information is used to refer to data that has been processed, interpreted, organized and/or structured. However, as used herein, no distinction is made between data and information, and the terms data and information are used interchangeably to refer to both unorganized facts and figures, as well as data that has been processed, interpreted, organized and/or structured An embodiment of the software application for the mobile device 12 can provide real time data feeds for display on the mobile device 12 at large venues that are the location of events such as sporting events, concerts, and conventions. In an embodiment, transceivers 14 are deployed throughout the venue to provide communication (and other) functions to a wireless communication device (e.g., mobile device 12) that can include, but are not limited to: a welcoming message at a front gate, a come again notice when leaving, invitations to visit restaurants and other establishments when exiting, specials broadcasted throughout the event, and statistics about the event in real time that are displayed with location affinity. Specials can include anything that the venue would like to draw consumer attention to such as availability of particular food types/merchandise and/or reduced prices at a location(s) in (or nearby) the venue. In an embodiment where the venue is a sport stadium where a game is taking place, the statistics can include the game statistics and optionally statistics about other sporting events.

The transceiver described herein may also be referred to as a "beacon" in the marketplace. A beacon may have all or a portion (e.g., transmit only) of the functionality of a transceiver.

In an embodiment, data feed sources can provide updates to a software application executing on a mobile device. This can be performed, for example, by real time applications and/or by applications in point-to-point settings. In embodiments, the real time data feeds are provided by the World Wide Web. Examples of types of real time data feeds that can be streamed to a mobile device 12 include, but are not limited to: rich site summary (RSS) used for example, for blogs; web feed, used for example, for news feeds; product feeds used for example, for e-commerce and Internet marketing; and sports data feeds that may or may not require structured data formats. Thus, data that can be streamed to the mobile device can include scores/statistics of sporting games having selected criteria (e.g., at the venue, near the venue, in a particular sport, having a particular player, etc.), stock tickers, weather reports, investment broker information, emergency alerts (e.g., Amber alerts), and venue related alerts (e.g., exits closed, safety information).

Figure 15:
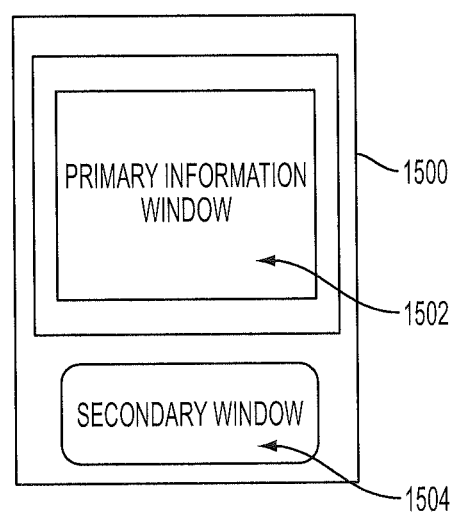
FIG. 15 illustrates a home screen which provides a user with access to real time data feeds in a close proximity notification system in accordance with an embodiment.

Turning now to FIG. 15, a home screen 1500 which provides a user with access to real time data feeds in a close proximity notification system in accordance with an embodiment is generally shown. The user interface of the home screen 1500 includes a primary information window 1502 and a secondary window 1504. In an embodiment, the primary information window 1502 includes a user interface into the software application running on the mobile device 12 described herein and/or includes a user interface to perform other services such as those provided by a cellular telephone company. In an embodiment, the secondary window 1504 is utilized to display real time data feeds such as those described above.

Figure 16:
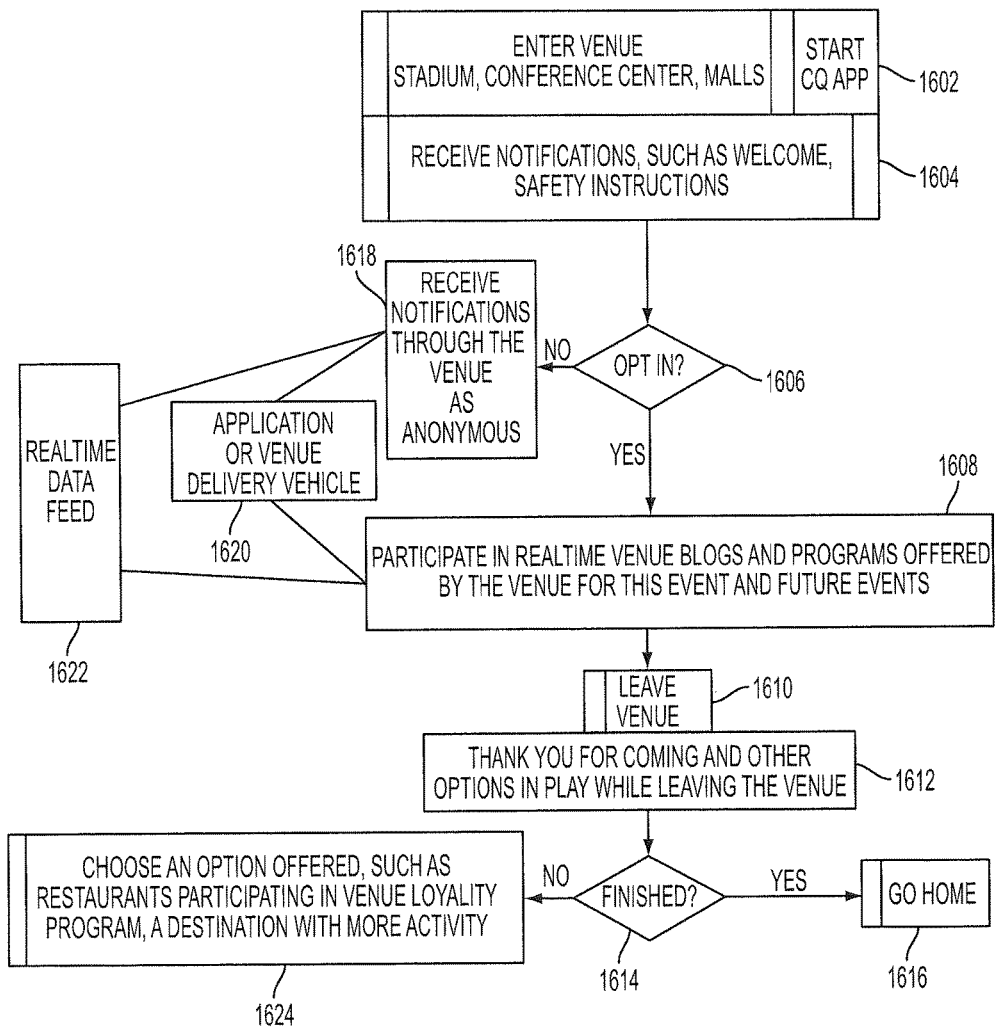
FIG. 16 illustrates a process for providing a user with access to real time data feeds in a close proximity notification system in accordance with an embodiment.

FIG. 16 illustrates a process for providing a user with access to real time data feeds in a close proximity notification system in accordance with an embodiment. The term "real time data feed" as used herein is a generic term for streaming data or information. The data or information can be sourced from any number of places such as, but not limited to: the Cloud, a wide area network (WAN), a local area network (LAN), a cellular network, and any other data store with data streaming software to wireless communication devices. At block 1602, a user of a wireless communication device enters the venue and starts execution of a software application on the wireless communication device. In an embodiment, the user is prompted to install the software application. In another embodiment, the software application is already installed and it becomes activated when the user comes within a proximity to the venue. At block 1604, the home screen 1500 displays notifications from the software application such as, but not limited to, a welcome message and/or safety instructions. In an embodiment, the notifications and real time data feeds can include one or more of visual, audio, and haptic communication methods.

Processing continues at block 1606, where the user is prompted by the software application, via the home screen 1500 (or via voice or some other manner) to opt-in to receiving real time data feeds. If the user opts in at block 1606, then processing continues at block 1608 where the user receives, via the secondary window 1504, a real time data feed 1622 that can be filtered by an application or venue delivery vehicle 1620. Block 1608 is performed while the user is at the venue. In an embodiment the application or venue delivery vehicle 1620 includes wireless communication devices such as, but not limited to smartphones, tablets, laptops with appropriate Apps or applications to interact with the users of these devices. The venue may have, but are not necessary, delivery vehicles to interact with users, such as monitors, KIOSKs, and touchpads. This allows the user of the mobile device 12 to participate in real time venue blogs and programs offered by the venue for the current event and/or future events. If the user decides not to opt-in at block 1606, then processing continues at block 1618 which is repeated while the user is at the venue. By not opting in the user is anonymous and cannot be identified for loyalty programs, real time venue blogs for the event or visible for a query to ascertain if they are present for the event. When the user choses to opt-in they are not anonymous and are known by either their full name, a chosen handle, an associated ID or wireless device identifier.

At block 1610, the user leaves the venue (or comes within a proximity of an exit point of the venue) and block 1612 is performed. At block 1612, the home screen 1500 on the user mobile device 12 can display exit messages such as "thank you for coming" and other messages. At block 1614, an indication of whether the user is finished with the application is received from the user. If the user is finished, then at block 1616 the application is exited. If the user is not finished, then block 1624 is performed and the home screen 1500 can display options for the user to select from, such as restaurants participating in a venue loyalty program and/or a destination(s) with more activity.

Embodiments include methods, computer program products and mobile devices for providing real time data feeds to a user of a mobile device. A method includes receiving a signal from a geographic location that is positioned within a space defined by an effective reception range of a short-range wireless communication transmitter, wherein the signal is received from the short-range wireless communication transmitter. The signal includes an identification code, and the receiving is by a mobile device of a user located within the space. The signal is processed on the mobile device and the processing includes determining whether information associated with the signal is stored on the mobile device, and identifying a retrieval location of the information based on the determining and on the signal. The processing of the signal is performed exclusively by a software application located on the mobile device and independently of any networks. Based on the processing, information from the retrieval location is retrieved using the mobile device. A real time data feed associated with the identification code is located. The information is displayed on the mobile device and the real time data feed is streamed on the mobile device.

In an embodiment, the displaying and the streaming are independent of each other. In an embodiment, the real time data feed and the information are integrated, and the displaying and streaming are based on the integrating. In an embodiment, the identification code is further associated with a venue and the short-range wireless communication transmitter is located in the venue. In an embodiment, the streaming continues while the mobile device is located in the venue. In an embodiment, the real time data feed includes data related to an event at the venue. In an embodiment, the real time data feed includes one or more of sporting game data, investment data, weather data, and emergency data.

Figure 17:
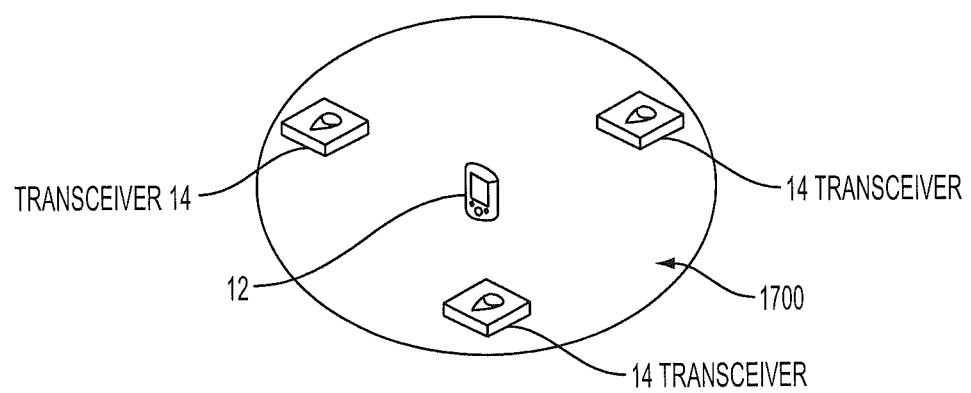
FIG. 17 illustrates a mobile device that is within a space defined by a system that includes three or more transceivers in accordance with an embodiment.

Embodiments of the system can be used to determine a location of a mobile device within one or more geographic areas. Referring now to FIG. 17, a system that can be used in a campus environment to determine a location of a mobile device 12 is generally shown in accordance with an embodiment. Campus environments can include, for example, college campuses, amusement parks, and zoos, as well as corporate and government campuses. In an embodiment a campus includes one or more geographic locations and can include two or more different physical locations that are geographically remote from each other (e.g., located in different cities, different towns, or different states). As shown in FIG. 17, a campus is populated with transceivers 14 that can be used in conjunction with a mobile device 12 to perform functions with or without an application present on the mobile device 12 and with or without a data server. The functions can include emergency call functions as well as functions related to campus information, maps, and/or directions.

As shown in FIG. 17, the range of the signals emitted from the transceiver define a space 1700 within which the mobile device 12 can be located using, for example, triangulation. An embodiment can be used in conjunction with the security call stations that are commonly used on college campuses to allow students (and others to alert campus security of emergency situations. Security call stations that are easily identified are typically installed at various fixed locations on a college campus and students are encouraged to use them to request assistance from campus security personnel. In accordance with an embodiment, transceivers can be installed in the security call stations and used to communicate with mobile devices 12 as described below in reference to FIG. 18. In this manner, emergency call functions can be performed using beacon hyper-local capability, which can include, but is not limited to: audio and/or visual alarms and/or messages, images and/or audio capture, personal identification, and wireless mobile device 12 identification. The location of the mobile device 12 can be determined using triangulation and mapping when three or more transceivers 14 are in communication range of the mobile device 12. This can be advantageous particularly in locations (e.g., basements of buildings) where cellular service or global positioning service (GPS) is inconsistent or otherwise not available. In another embodiment, the location of the mobile device 12 can be determined using GPS or cell tower triangulation.

Figure 18:
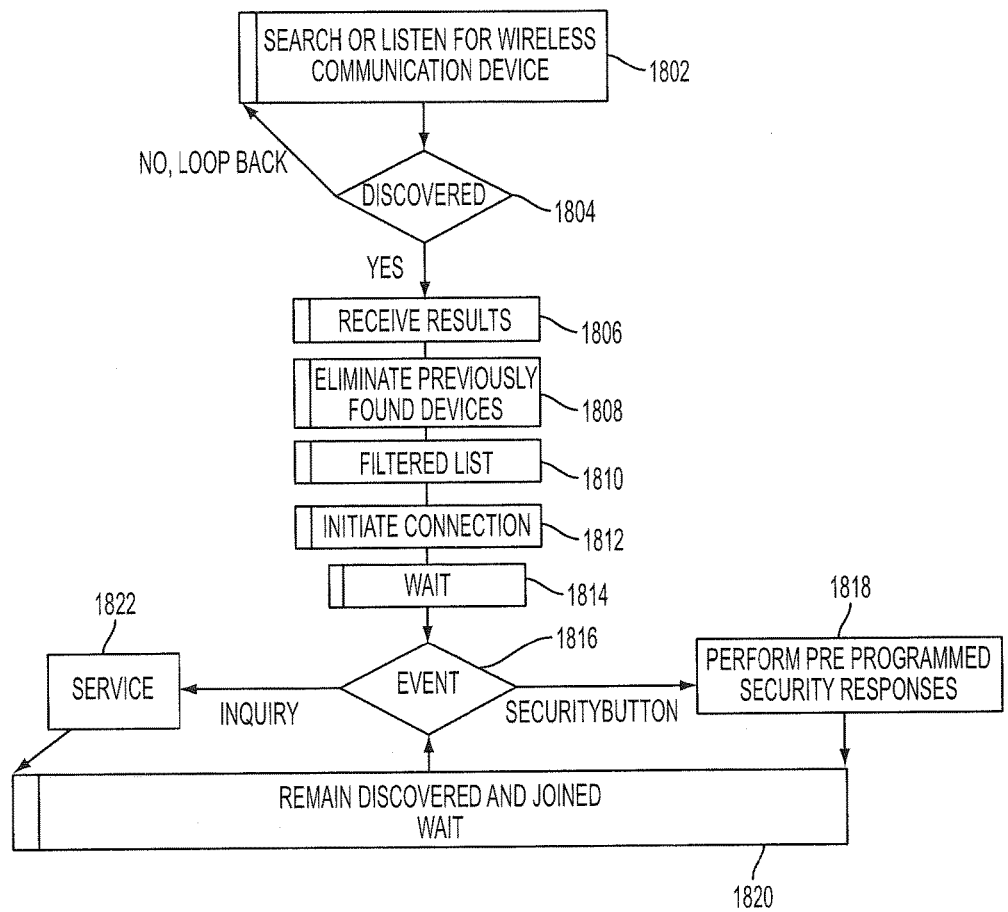
FIG. 18 illustrates a process for providing location identification information in a campus environment in accordance with an embodiment.

FIG. 18 illustrates a process for providing location identification information in a campus environment in accordance with an embodiment. At block 1802, a mobile device 12 is searching or listening for nearby wireless communication devices (e.g., a transceiver 14). At block 1804, it is determined whether a wireless communication device has been discovered. If a device has not been discovered, processing continues at block 1802. If a wireless communication device has been discovered, then processing continues at block 1806 where the results of the search (e.g., an identifier of a discovered device) are received. At block 1808, previously found devices are eliminated from the list and at block 1810, the list can be filtered to include only devices not previously found (e.g., within a specific timeframe) and/or belonging to a specified one more types of wireless communication devices defined by a device class or classes.

At block 1812, the mobile device 12 initiates a connection with the transceiver 1812 and then enters a wait state at block 1814. At block 1816, an event is detected by the user interface (e.g., based on a user input) via the user interface on the mobile device 12. If the event was an activation of a security button, then block 1818 is performed and a preprogrammed security response is performed. In an embodiment, this can include activating the security call station to notify the campus security (or police). The exact location of the mobile device 12 can also be provided using, for example, triangulation of signals from the transceivers 14, and updated in near real time, which can be useful in locating the person requesting assistance if the requestor has moved to another location. Processing then continues at block 1820 where the mobile device 12 remains discovered and joined to a transceiver(s) 14 as long as the mobile device 12 is within the transmission range of the transceiver(s) 14. In embodiment, a path taken by the mobile device 12 can be tracked (e.g., providing a "bread crumb" feature). Also at block 1816, the mobile device 12 waits for another event to occur. If it is determined at block 1816, that the event is an inquiry, then block 1822 is performed and the inquiry (e.g., directions, a calendar of upcoming events, a transportation schedule, a cafeteria menu, and a map of the campus) is serviced. Processing then continues at block 1820.

In an embodiment, the default is for the mobile device 12 to opt-in to the security functions described herein when the mobile device 12 is located on the campus. In an embodiment, the user of the mobile device 12 can opt-out via one or more user interface screens.

In an embodiment, a wireless communication device that communicates with the transceiver is a chip that is attached (externally or integrated into) a plastic card such as a student identification card or other identification card (e.g., same size as a credit card). In this embodiment, a subset of the security functions (e.g., notification of location of device and notification of campus security) can be performed based, for example, on the user pressing a specified location (s) on the plastic card which is designated as the security button.

Embodiments include methods, computer program products, and mobile devices for providing assistance to a user of a mobile device. A method includes receiving a signal from a geographic location that is positioned within a space defined by an effective reception range of a short-range wireless communication transmitter. The signal is received from the short-range wireless communication transmitter, the signal includes an identification code, and the receiving is by a mobile device of a user located within the space. The signal is processed on the mobile device and includes: determining whether information associated with the signal is stored on the mobile device; and identifying a retrieval location of the information based on the determining and on the signal. The processing of the signal is performed exclusively by a software application located on the mobile device and independently of any networks. Based on the processing, information is retrieved from the retrieval location using the mobile device, the information including an address of a security system. The mobile device is monitored for inputs and based on receiving a security request, the security request is transmitted to the security system.

In an embodiment, the security request includes a location of the mobile device. In an embodiment, a reset command is received and the security request that includes a location of the mobile device is transmitting periodically prior to receiving the reset command. In an embodiment, the location is determined by the mobile device using triangulation based on signals received at the mobile device from three or more short-range wireless communication transmitters. In an embodiment, one or more of a camera, audio device, and video device are activated on the mobile device based on receiving the security request. In an embodiment, output from the one or more of a camera, audio device, and video device is transmitted to the security system. In an embodiment, in response to receiving an input at the mobile device that includes an inquiry, the inquiry is responded to. In an embodiment, in response to the transmitting, data is received from the security system; and a message is output via the mobile device, the message is based on the data received from the security system. In an embodiment, the message is at least one of visual, audio and haptic. In an embodiment, the short-range wireless communication transmitter is contained in a security call system. In an embodiment, an input that includes an inquiry is received at the mobile device and the inquiry is responded to. In an embodiment, an input is received at the mobile device that includes a request for additional the information; based on receiving the input, the additional information is retrieved from the retrieval location using the mobile device; and the additional information is displayed on the mobile device.

Embodiments include methods, computer program products, and mobile devices for providing assistance to a user of a mobile device. A method includes receiving a signal from a geographic location that is positioned within a space defined by an effective reception range of a short-range wireless communication transmitter. The signal is received from the short-range wireless communication transmitter, the signal includes an identification code, and the receiving is by a mobile device of a user located within the space. The signal is processed on the mobile device and includes: determining whether information associated with the signal is stored on the mobile device; and identifying a retrieval location of the information based on the determining and on the signal. The processing of the signal is performed exclusively by a software application located on the mobile device and independently of any networks. Based on the processing, information is retrieved from the retrieval location using the mobile device, the information including an address of a security system. The mobile device is monitored for inputs. Based on receiving an input that includes a request for at least a subset of the information, the at least a subset of the information is retrieved from the retrieval location using the mobile device and displayed on the mobile device.

Figure 19:
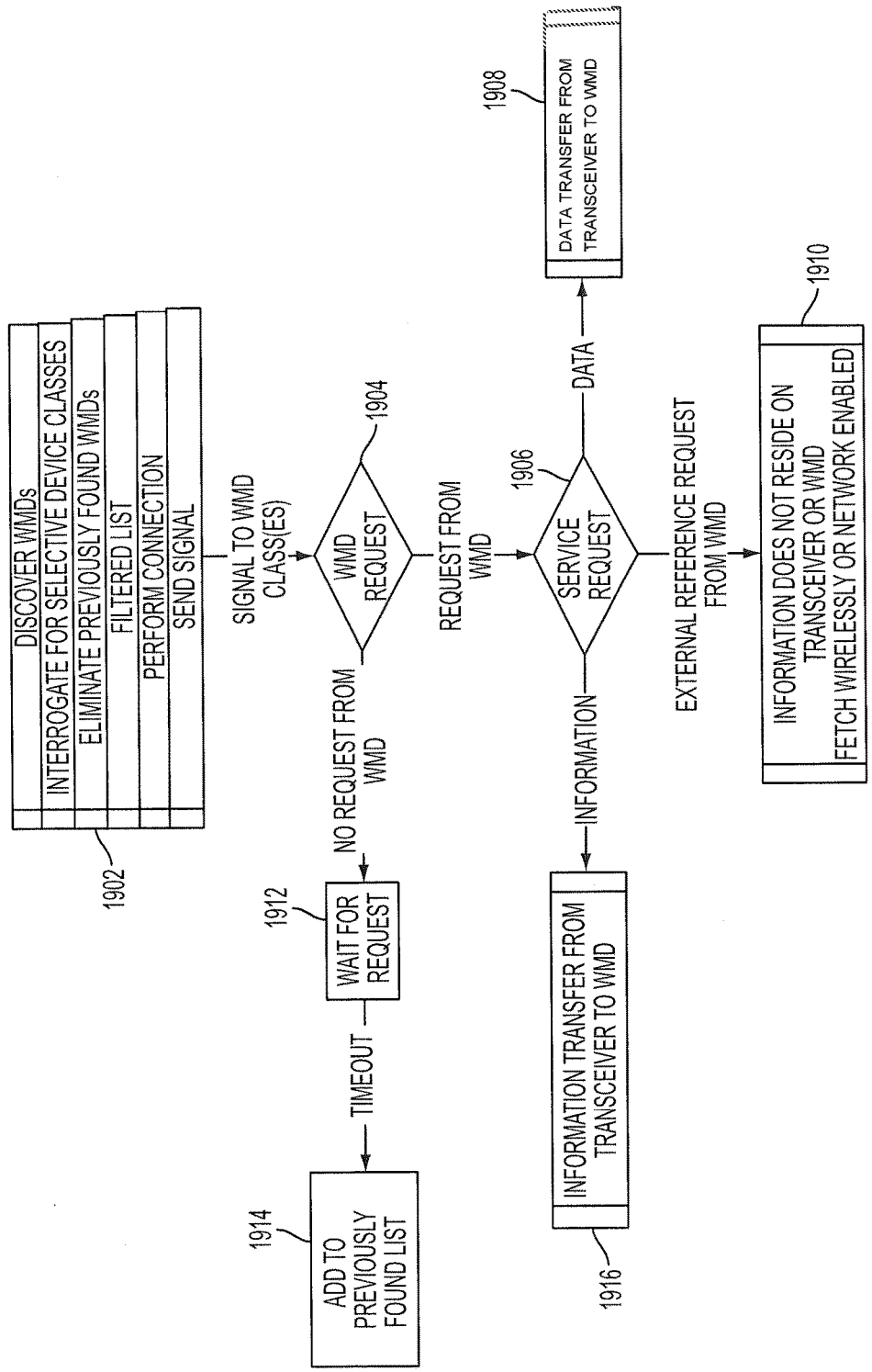
FIG. 19 illustrates a process for providing data to a mobile device via a transceiver in accordance with an embodiment.

Referring now to FIG. 19, a process for providing data to a mobile device via a transceiver is generally shown in accordance with an embodiment. In an embodiment, the transceiver 14 and the mobile device 12 are in a space 26 such as that shown in FIG. 2. In the embodiment shown in FIG. 19, a portion of the functionality described previously as being performed by a close proximity notification application installed on the mobile device 12 is being performed by the transceiver 14.

At block 1902, the transceiver 14 initiates communication with one or more wireless mobile devices 12 by: discovering wireless mobile devices within a proximity range of the transceiver 14; interrogating for selective device, classes, eliminating previously found wireless mobile devices 12, connecting to the filtered list of wireless mobile devices 12, and sending a signal to the wireless mobile devices 12 in the filtered list. At block 1904, it is determined if a request has been received from one of the wireless mobile devices 12. If no request has been received, processing continues at block 1912 with the transceiver 14 waiting for a request, followed by block 1914 after a timeout period where the wireless mobile device 12 is added to a list of previously found wireless mobile devices 12. If it is determined at block 1904 that a request has been received from the wireless mobile device 12, processing continues at block 1906 where the transceiver 14 determines the type of service request that has been received. If the service request is a request for information that is located on the transceiver 14, then processing continues at block 1916 where information that is located on the transceiver 14 is transmitted to the wireless mobile device 12. If the service request is a request for information that is not located on the transceiver 14, then processing continues at block 1910 where the transceiver fetches the information via the network (e.g., WiFi, Bluetooth, LAN, WAN, cellular) and then transmits the information to the wireless mobile device 12. In another embodiment, the transceiver 14 transmits the location of the information to the wireless mobile device 12. If it is determined at block 1906 that the service request is a request for data located on the transceiver 14, then processing continues at block 1908 where data that is located on the transceiver 14 is transmitted to the wireless mobile device 12.

In an embodiment, the transceiver 14 discovers wireless mobile devices 12 and then transfers information that has an affinity to the transceiver 14 location to the wireless mobile devices 12. The transceiver 14 can dialog with the wireless mobile device 12 for context information relative to the wireless mobile device 12 and then filter the transfer of data or information to the wireless mobile device 12. The wireless mobile device 12 can be implemented in a variety of manners including, but not limited to: as a system on a chip (e.g., attached to a credit card sized plastic card), as part of a smartphone, as part of a laptop. Embodiments described herein distribute the data and information as close to a user as possible by enabling the transceiver 14, which has close proximity to the user, to share or server information, and data, with the wireless mobile devices 12.

An embodiment of the transceiver 14 can process data interchanged with the wireless mobile device 12. In an embodiment, the transceiver 14 is a standalone system that is updated using, for example, a flash drive. In another embodiment, the transceiver 14 can be locally connected to one or more networks such as, but not limited to: wireless fidelity (WiFi) networks, LANS, WANS, and cellular networks to obtain data and/or information. The footprints of the wireless mobile device 12 and the transceiver 14 from a physical or logical perspective can scale from minute (e.g., system-on-a-chip) to as large as a fully capable computing system (e.g., desktop personal computer, mainframe computer). In one embodiment, the wireless mobile device 12 can be a system-on-a-chip with Bluetooth capability and a screen as small as one square inch. In another embodiment, the transceiver 14 can be as large as a fully capable computing system acting as a transceiver 14 for hyper-local close proximity.

The transceiver 14 can be a system-on-a-chip with Bluetooth and/or a WiFi chip. In an embodiment, the transceiver 14 is updated manually using, for example, a flash device. In another embodiment, the transceiver 14 is updated automatically (e.g., in real time) via a network connection such as Wi-Fi, LAN, and/or WAN. In this embodiment, the wireless mobile device 12 would not need to be a smart device and it could be implemented by a device that is capable of displaying the close proximity data or information pushed to it from the transceiver 14. In an embodiment, the transceiver 14 identifies a wireless mobile device class group or an identifier of a specific wireless mobile device 12. The group or device identifier is processed by the transceiver 14 to locate related data or information. If the data or information is not local to the transceiver 14, then the transceiver 14 navigates through one or more networks to locate the data or information. The located data or information is then pushed (or transmitted) to the wireless mobile device 12.

Embodiments include methods, computer program products and transceivers for distributed data in a close proximity notification system. A transceiver includes an antenna, a processing device that includes a memory. The memory stores instructions that when executed by the processing device result in: discovery of wireless mobile devices within a proximity range of the transceiver; initiating communication between the transceiver and one or more of the wireless mobile devices; exchanging data with the one or more of the wireless mobile devices, the exchanging comprising receiving a request for information from one of the one or more of the wireless mobile devices; based on receiving the request for information, identifying a retrieval location of at least a subset of the requested information; and transmitting the information or an identifier of the retrieval location to the wireless mobile device.

In an embodiment, the instructions when executed by the processing device further result in retrieving the information from the retrieval location and transmitting the information to the wireless mobile device. In an embodiment, the instructions when executed by the processing device further result in transmitting an identifier of the retrieval location to the wireless mobile device. In an embodiment, the retrieval location is located on the transceiver. In an embodiment, the retrieval location is located on a data server that is accessible to the transceiver via a network. In an embodiment, the one or more of the wireless mobile devices conform to one or more specified communication protocols. In an embodiment, the one or more of the wireless mobile devices are included in one or more specified device classes. In an embodiment, the discovering is periodically performed. In an embodiment, the identifiers of the one or more of the wireless mobile devices are stored in the memory device for a specified time period.

In an embodiment, the exchanging data further includes receiving data from at least one of the one or more of the wireless mobile devices, and the data includes an identifier of the at least one of the one or more of the wireless mobile devices. In an embodiment, the exchanging data further includes transmitting data to at least one of the one or more of the wireless mobile devices, and the data includes a unique identifier associated with the transceiver. In an embodiment, the discovering and initiating are transparent to users of the one or more of the wireless mobile devices. In an embodiment, the exchanging data is transparent to the users of the one or more of the wireless mobile devices. In an embodiment, the proximity range is between about 10 and 150 meters. In an embodiment, the proximity range is less than about 50 meters. In an embodiment, the proximity range is less than about 30 meters. In an embodiment, the proximity range is adjustable. In an embodiment, the transceiver is mobile. In an embodiment, the transceiver is stationary.

In an embodiment, the information comprises a coupon. In an embodiment, the information includes availability of commercial goods. In an embodiment, the information is time-sensitive. In an embodiment, the information includes data describing a real estate property or a retrieval location.

In an embodiment, the information includes promotional material related to a geographic location that is in a large venue. In an embodiment, the information includes promotional material related to a business. In an embodiment, the business is a store that sells commercial goods.

In an embodiment, the transceiver includes an antenna, and a processing device (which includes a memory device) that includes instructions to execute BLE for discovery. In addition, the processing device can have a rich set of persistent memory, program code, and data to perform some standard functions (e.g., compare, get, put, etc.) and have the ability to process data (including data stored on the transceiver). In this embodiment, the processing devices of the transceiver stores instructions that when executed by the processing device may perform discovery of wireless mobile devices within a proximity range of the transceiver; initiating of communication between the transceiver and one or more of the wireless mobile devices; exchanging of data with the one or more of the wireless mobile devices, the exchanging comprising receiving a request for information from one of the one or more of the wireless mobile devices; and based on receiving the request for information, identifying a retrieval location of at least a subset of the requested information. The retrieval location can be on the transceiver or accessible via a network. In an embodiment, the data is stored on the transceiver and it may be filtered and then pushed out from the transceiver to the wireless mobile devices. In this embodiment, where the data and the processing reside on the transceiver, the wireless mobile device may be as small as a system-on-a-chip with a display as small as one square inch or a display as large as the largest LCD screen.

What is claimed is:

1. A transceiver comprising:
   an antenna;
   a data storage device; and
   a processing device that includes a memory configured for storing instructions that when executed by the processing device result in:
      discovery of other transceivers within a proximity range of the transceiver;
      initiating communication between the transceiver and one or more of the other transceivers;
      exchanging data with the one or more of the other transceivers, the exchanging including receiving a request for information from one of the one or more other transceivers;
      based on receiving the request for information, identifying a retrieval location of at least a subset of the requested information; and
      transmitting the at least a subset of the information or an identifier of the retrieval location to the other transceiver.

2. The transceiver of claim 1, wherein the instructions when executed by the processing device further result in retrieving the information from the retrieval location.

3. The transceiver of claim 1, wherein the retrieval location is located on the transceiver.

4. The transceiver of claim 1, wherein the retrieval location is located on a data server that is accessible to the transceiver via a network.

5. The transceiver of claim 1, wherein the one or more of the other transceivers conform to one or more specified communication protocols.

6. The transceiver of claim 1, wherein the one or more of the other transceivers are included in one or more specified device classes.

7. The transceiver of claim 1, wherein the discovery is performed periodically, or in response to an external query within a proximity communication protocol or a user defined discovery methodology.

8. The transceiver of claim 1, wherein identifiers of the one or more of the other transceivers are stored in the memory device for a specified time period.

9. he transceiver of claim 1, wherein the exchanging data further includes receiving data from at least one of the one or more of the other transceiver or a network resource.

10. The transceiver of claim 1, wherein the exchanging data further includes transmitting data to at least one of the one or more of the other transceivers or a network recource.

11. The transceiver of claim 1, wherein the discovery and initiating are transparent to users of the one or more of the other transceivers.

12. The transceiver of claim 1, wherein the exchanging data is transparent to the users of the one or more of the wireless mobile devices.

13. The transceiver of claim 1, wherein the proximity range is between about 10 and 150 meters.

14. The transceiver of claim 1, wherein the proximity range is less than about 50 meters.

15. The transceiver of claim 1, wherein the proximity range is less than about 30 meters.

16. The transceiver of claim 1, wherein the proximity range is adjustable.

17. The transceiver of claim 1, wherein the transceiver is mobile.

18. The transceiver of claim 1, wherein the transceiver is stationary.

19. A method for data exchange at a transceiver, the method comprising:
   discovery of other transceivers within a proximity range of the transceiver, the transceiver including a data storage device and the discovery performed using the transceiver;
   initiating communication between the transceiver and one or more of the other transceivers, the initiating performed using the transceiver;
   exchanging data with the one or more of the other transceivers, the exchanging including receiving a request for information from one of the one or more of the other transceivers;
   based on receiving the request for information, identifying, by the transceiver, a retrieval location of at least a subset of the requested information; and
   transmitting, from the transceiver, the at least a subset of the information or an identifier of the retrieval location to the other transceivers.

20. A computer program product comprising a non-transitory computer-readable storage medium comprising computer-readable instructions, which instructions, when executed by a processing device located in a transceiver, cause the transceiver to perform operations comprising:
   discovery of other transceivers within a proximity range of the transceiver;
   initiating communication between the transceiver and one or more of the other transceivers;
   exchanging data with the one or more of the other transceivers, the exchanging including receiving a request for information from one of the one or more of the other transceivers;
   based on receiving the request for information, identifying a retrieval location of at least a subset of the requested information; and transmitting the at least a subset of the information or an identifier of the retrieval location to the other transceivers.

\* \* \* \* \*